US012574393B2

(12) United States Patent
Fellows et al.

(10) Patent No.: US 12,574,393 B2
(45) Date of Patent: Mar. 10, 2026

(54) CYBER SECURITY SYSTEM UTILIZING INTERACTIONS BETWEEN DETECTED AND HYPOTHESIZE CYBER-INCIDENTS

(71) Applicant: Darktrace Holdings Limited, Cambridge (GB)

(72) Inventors: Simon David Lincoln Fellows, Cambridge (GB); Timothy Owen Bazalgette, Knebworth (GB); Marko Marsenic, Cambridge (GB); Dickon Murray Humphrey, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 409 days.

(21) Appl. No.: 17/859,841

(22) Filed: Jul. 7, 2022

(65) Prior Publication Data

US 2022/0360597 A1     Nov. 10, 2022

Related U.S. Application Data

(63) Continuation-in-part of application No. 17/187,373, filed on Feb. 26, 2021, now Pat. No. 12,034,767.
(Continued)

(51) Int. Cl.
*H04L 9/40* (2022.01)
(52) U.S. Cl.
CPC ...... *H04L 63/1416* (2013.01); *H04L 63/1441* (2013.01)
(58) Field of Classification Search
None
See application file for complete search history.

(56) References Cited

U.S. PATENT DOCUMENTS 6,154,844 A     11/2000  Touboul et al.
6,965,968 B1    11/2005  Touboul
(Continued)

FOREIGN PATENT DOCUMENTS

EP      2922268 A1     9/2015
WO   2001031420 A2     5/2001
(Continued)

OTHER PUBLICATIONS

Patent Cooperation Treaty, International Search Report, Dec. 6, 2022, 2 pages.
(Continued)

*Primary Examiner* — Kambiz Zand
*Assistant Examiner* — Mahabub S Ahmed
(74) *Attorney, Agent, or Firm* — Rutan and Tucker, LLP

(57) ABSTRACT

An apparatus may include a set of modules and artificial intelligence models to detect a cyber incident, a simulator to simulate an actual cyber attack of the cyber incident on a network including physical devices being protected by the set of modules and artificial intelligence models; and a feedback loop between i) the set of modules and artificial intelligence models and ii) the simulator, during an ongoing detected cyber incident. An attack path modeling module is configured to feed details of the detected incident by a cyber threat module into an input module of the simulator, and to run one or more hypothetical simulations of that detected incident in order to predict and control an autonomous response to the detected incident. Any software instructions forming part of the set of modules, the artificial intelligence models, and the simulator are stored in an executable form in memories and executed by processors.

20 Claims, 14 Drawing Sheets

Related U.S. Application Data which is a continuation-in-part of application No. 17/004,392, filed on Aug. 27, 2020, now Pat. No. 11,709,944.

(60) Provisional application No. 63/219,026, filed on Jul. 7, 2021, provisional application No. 63/274,376, filed on Nov. 1, 2021, provisional application No. 63/317,157, filed on Mar. 7, 2022, provisional application No. 62/893,350, filed on Aug. 29, 2019, provisional application No. 62/983,307, filed on Feb. 28, 2020.

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 7,890,869 B1 | 2/2011 | Mayer et al. | |
| 8,312,540 B1 | 11/2012 | Kahn et al. | |
| 8,387,116 B2 | 2/2013 | Deguchi | |
| 8,407,798 B1* | 3/2013 | Lotem | G06F 21/55 |
| | | | 726/21 |
| 8,484,741 B1 | 7/2013 | Chapman | |
| 8,621,614 B2* | 12/2013 | Vaithilingam | H04L 51/212 |
| | | | 713/188 |
| 8,661,538 B2 | 2/2014 | Cohen-Ganor et al. | |
| 8,819,803 B1 | 8/2014 | Richards et al. | |
| 8,879,803 B2 | 11/2014 | Ukil et al. | |
| 8,881,288 B1* | 11/2014 | Levy | G06F 21/577 |
| | | | 709/225 |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,176,951 B2 | 11/2015 | Patrudu | |
| 9,185,095 B1 | 11/2015 | Moritz et al. | |
| 9,213,990 B2 | 12/2015 | Adjaoute | |
| 9,239,908 B1* | 1/2016 | Constantine | G06F 21/00 |
| 9,292,695 B1* | 3/2016 | Bassett | G06F 21/577 |
| 9,344,444 B2 | 5/2016 | Lippmann | |
| 9,348,742 B1 | 5/2016 | Brezinski | |
| 9,369,484 B1* | 6/2016 | Lacerte | H04L 63/1416 |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,641,544 B1 | 5/2017 | Treat et al. | |
| 9,680,855 B2 | 6/2017 | Schultz | |
| 9,712,548 B2 | 7/2017 | Shmueli et al. | |
| 9,727,723 B1 | 8/2017 | Kondaveeti et al. | |
| 9,742,803 B1* | 8/2017 | Kras | G06F 21/56 |
| 9,749,360 B1 | 8/2017 | Irimie | |
| 9,954,884 B2 | 4/2018 | Hassell | |
| 9,971,973 B1 | 5/2018 | Smith | |
| 10,237,298 B1 | 3/2019 | Nguyen et al. | |
| 10,268,821 B2 | 4/2019 | Stockdale et al. | |
| 10,320,713 B2 | 6/2019 | Alsup et al. | |
| 10,320,813 B1* | 6/2019 | Ahmed | H04L 63/1416 |
| 10,382,473 B1* | 8/2019 | Ashkenazy | H04L 63/1466 |
| 10,419,466 B2 | 9/2019 | Ferguson et al. | |
| 10,516,693 B2 | 12/2019 | Stockdale et al. | |
| 10,601,865 B1* | 3/2020 | Mesdaq | H04L 63/1425 |
| 10,659,335 B1* | 5/2020 | Morris | H04L 43/50 |
| 10,701,093 B2 | 6/2020 | Dean et al. | |
| 10,754,959 B1* | 8/2020 | Rajasooriya | G06N 7/01 |
| 10,812,521 B1 | 10/2020 | Sharifi Mehr | |
| 10,848,512 B2* | 11/2020 | Murphy | H04L 63/145 |
| 10,848,515 B1* | 11/2020 | Pokhrel | H04L 63/1433 |
| 11,228,612 B2* | 1/2022 | Vajipayajula | H04L 63/1466 |
| 11,310,268 B2* | 4/2022 | Bowditch | H04L 63/1483 |
| 11,316,875 B2 | 4/2022 | Frey | |
| 11,587,177 B2 | 2/2023 | Sankar | |
| 11,687,825 B2 | 6/2023 | Khan | |
| 11,902,321 B2* | 2/2024 | Beck | G06F 40/40 |
| 12,041,082 B2 | 7/2024 | Lam | |
| 2002/0174217 A1 | 11/2002 | Anderson et al. | |
| 2002/0186698 A1 | 12/2002 | Ceniza | |
| 2003/0051026 A1 | 3/2003 | Carter | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2005/0193430 A1 | 9/2005 | Cohen | |
| 2006/0021044 A1* | 1/2006 | Cook | H04L 63/1433 |
| | | | 726/25 |
| 2006/0021046 A1* | 1/2006 | Cook | G06F 21/577 |
| | | | 726/25 |
| 2006/0021047 A1* | 1/2006 | Cook | H04L 63/1433 |
| | | | 726/25 |
| 2006/0021048 A1* | 1/2006 | Cook | H04L 63/1433 |
| | | | 726/25 |
| 2006/0021050 A1* | 1/2006 | Cook | H04L 63/1433 |
| | | | 726/25 |
| 2006/0191010 A1 | 8/2006 | Benjamin | |
| 2007/0118909 A1 | 5/2007 | Hertzog et al. | |
| 2007/0192855 A1* | 8/2007 | Hulten | H04L 63/1483 |
| | | | 707/E17.115 |
| 2007/0294187 A1 | 12/2007 | Scherrer | |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2008/0167920 A1* | 7/2008 | Schmidt | G06Q 90/00 |
| | | | 705/7.42 |
| 2009/0007270 A1 | 1/2009 | Futoransky | |
| 2009/0077666 A1 | 3/2009 | Chen | |
| 2009/0106174 A1 | 4/2009 | Battisha et al. | |
| 2009/0254971 A1 | 10/2009 | Herz et al. | |
| 2010/0009357 A1 | 1/2010 | Nevins et al. | |
| 2010/0058456 A1* | 3/2010 | Jajodia | G06F 21/552 |
| | | | 726/11 |
| 2010/0095374 A1 | 4/2010 | Gillum et al. | |
| 2010/0107254 A1 | 4/2010 | Eiland et al. | |
| 2010/0125908 A1 | 5/2010 | Kudo | |
| 2010/0138925 A1 | 6/2010 | Barai | |
| 2010/0192195 A1 | 7/2010 | Dunagan | |
| 2010/0235908 A1 | 9/2010 | Eynon et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0055404 A1 | 2/2013 | Khalili | |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0198846 A1* | 8/2013 | Chapman | G06Q 10/0635 |
| | | | 726/25 |
| 2013/0254885 A1 | 9/2013 | Devost | |
| 2013/0297375 A1 | 11/2013 | Chapman | |
| 2013/0312101 A1* | 11/2013 | Lotem | G06F 21/55 |
| | | | 726/25 |
| 2013/0318616 A1* | 11/2013 | Christodorescu | G06F 21/552 |
| | | | 726/25 |
| 2014/0007237 A1 | 1/2014 | Wright et al. | |
| 2014/0007241 A1 | 1/2014 | Gula | |
| 2014/0074762 A1 | 3/2014 | Campbell | |
| 2014/0165207 A1 | 6/2014 | Engel et al. | |
| 2014/0215618 A1 | 7/2014 | Amit | |
| 2014/0223562 A1* | 8/2014 | Liu | G06N 3/006 |
| | | | 726/23 |
| 2014/0325643 A1 | 10/2014 | Bart et al. | |
| 2015/0058993 A1* | 2/2015 | Choi | H04L 63/1433 |
| | | | 726/25 |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |

(56) References Cited

U.S. PATENT DOCUMENTS

| | | |
|---|---|---|
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0287336 A1* | 10/2015 | Scheeres .................. G09B 5/02 |
| | | 434/156 |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2015/0381649 A1* | 12/2015 | Schultz .............. G06Q 10/0635 |
| | | 726/25 |
| 2016/0044059 A1* | 2/2016 | Fine .................... H04L 63/1466 |
| | | 726/23 |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0205122 A1* | 7/2016 | Bassett .............. H04L 63/1441 |
| | | 726/23 |
| 2016/0241576 A1 | 8/2016 | Rathod et al. |
| 2016/0306980 A1 | 10/2016 | Kotler |
| 2016/0330238 A1* | 11/2016 | Hadnagy ............. H04L 63/1483 |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0026388 A1* | 1/2017 | Gatti ................... H04L 63/1483 |
| 2017/0046519 A1* | 2/2017 | Cam ........................ G06N 7/01 |
| 2017/0048266 A1* | 2/2017 | Hovor ................. H04L 63/1433 |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0214701 A1* | 7/2017 | Hasan ................. H04L 63/1433 |
| 2017/0230323 A1 | 8/2017 | Jakobsson |
| 2017/0270422 A1 | 9/2017 | Sorakado |
| 2017/0359359 A1 | 12/2017 | Jaladi |
| 2018/0027006 A1 | 1/2018 | Zimmermann et al. |
| 2018/0041537 A1* | 2/2018 | Bloxham ............. H04L 63/0263 |
| 2018/0052993 A1 | 2/2018 | Jou |
| 2018/0075243 A1* | 3/2018 | Thomas .................. G06F 30/20 |
| 2018/0124108 A1* | 5/2018 | Irimie ................. H04L 63/1483 |
| 2018/0167402 A1 | 6/2018 | Scheidler et al. |
| 2018/0219901 A1* | 8/2018 | Gorodissky ......... H04L 63/1433 |
| 2018/0234435 A1 | 8/2018 | Cohen |
| 2018/0288073 A1 | 10/2018 | Hopper |
| 2018/0295154 A1* | 10/2018 | Crabtree ............. H04L 63/1433 |
| 2018/0324207 A1 | 11/2018 | Reybok |
| 2018/0359272 A1* | 12/2018 | Mizrachi ............... H04L 67/535 |
| 2018/0367549 A1* | 12/2018 | Jang ........................ G06N 5/022 |
| 2019/0014141 A1* | 1/2019 | Segal .................. H04L 63/1483 |
| 2019/0014149 A1* | 1/2019 | Cleveland ............... G06F 21/51 |
| 2019/0036948 A1 | 1/2019 | Appel et al. |
| 2019/0044963 A1 | 2/2019 | Rajasekharan et al. |
| 2019/0114245 A1* | 4/2019 | Mermoud .......... G06F 11/3466 |
| 2019/0149572 A1 | 5/2019 | Gorodissky |
| 2019/0171984 A1* | 6/2019 | Irimie ................. G06Q 10/0635 |
| 2019/0173917 A1* | 6/2019 | Sites ..................... G06V 10/82 |
| 2019/0173918 A1* | 6/2019 | Sites ..................... G06N 3/0985 |
| 2019/0173919 A1* | 6/2019 | Irimie ...................... G06N 3/09 |
| 2019/0182266 A1* | 6/2019 | Doron .................. H04L 63/145 |
| 2019/0199746 A1* | 6/2019 | Doron .................... G06N 20/00 |
| 2019/0238571 A1* | 8/2019 | Adir .................... H04L 63/1425 |
| 2019/0245875 A1* | 8/2019 | Chen ........................ H04L 9/32 |
| 2019/0245883 A1* | 8/2019 | Gorodissky ......... H04L 63/1433 |
| 2019/0251260 A1 | 8/2019 | Stockdale et al. |
| 2019/0260783 A1 | 8/2019 | Humphrey |
| 2019/0297096 A1* | 9/2019 | Ahmed .................. G06N 20/00 |
| 2019/0342307 A1* | 11/2019 | Gamble ............... G06F 16/907 |
| 2019/0347578 A1* | 11/2019 | Bolding ............. H04L 63/1433 |
| 2019/0349400 A1* | 11/2019 | Bruss ..................... G06N 20/00 |
| 2020/0034752 A1* | 1/2020 | Luo ........................ H04L 51/42 |
| 2020/0067962 A1 | 2/2020 | Tan |
| 2020/0097597 A1 | 3/2020 | Lourentzou |
| 2020/0143053 A1* | 5/2020 | Gutierrez .............. G06F 21/554 |
| 2020/0177615 A1* | 6/2020 | Grabois .................. H04L 63/20 |
| 2020/0177617 A1* | 6/2020 | Hadar ................... G06F 21/552 |
| 2020/0177618 A1* | 6/2020 | Hassanzadeh ........ G06F 21/552 |
| 2020/0201992 A1* | 6/2020 | Hadar ..................... G06F 21/56 |
| 2020/0201997 A1 | 6/2020 | Hadar |
| 2020/0244673 A1 | 7/2020 | Stockdale |
| 2020/0267183 A1* | 8/2020 | Vishwanath ........ H04L 63/1483 |
| 2020/0280575 A1 | 9/2020 | Dean et al. |
| 2020/0351295 A1 | 11/2020 | Nhlabatsi |
| 2020/0358798 A1* | 11/2020 | Maylor ............... H04L 63/1433 |
| 2020/0379079 A1* | 12/2020 | Dupray ................. H04W 64/00 |
| 2020/0382543 A1 | 12/2020 | Hoopes |
| 2020/0389486 A1 | 12/2020 | Jeyakumar |
| 2021/0012012 A1* | 1/2021 | Soroush .................... G06N 5/04 |
| 2021/0014256 A1* | 1/2021 | Malhotra ............ H04L 63/1441 |
| 2021/0021612 A1 | 1/2021 | Higbee |
| 2021/0021629 A1* | 1/2021 | Dani ................... H04L 63/1433 |
| 2021/0029154 A1* | 1/2021 | Picard ................. H04L 63/1408 |
| 2021/0029164 A1* | 1/2021 | Albero .................... H04L 63/20 |
| 2021/0092153 A1* | 3/2021 | Wei ........................ H04L 47/29 |
| 2021/0120027 A1 | 4/2021 | Dean et al. |
| 2021/0157919 A1 | 5/2021 | Stockdale et al. |
| 2021/0194924 A1 | 6/2021 | Heinemeyer |
| 2021/0273958 A1 | 9/2021 | McLean |
| 2021/0281596 A1* | 9/2021 | Covell ............... H04L 63/1483 |
| 2021/0367962 A1* | 11/2021 | Kurowski ............. G06F 21/577 |
| 2021/0409449 A1* | 12/2021 | Crabtree ............. H04L 63/1408 |
| 2022/0078210 A1 | 3/2022 | Crabtree |
| 2022/0086064 A1 | 3/2022 | Sivaraman |
| 2022/0210200 A1* | 6/2022 | Crabtree ............... G06F 16/951 |
| 2022/0358607 A1 | 11/2022 | Guo |
| 2022/0360597 A1 | 11/2022 | Fellows |
| 2023/0315851 A1 | 10/2023 | Wei |

FOREIGN PATENT DOCUMENTS

| | | |
|---|---|---|
| WO | 2008121945 | 10/2008 |
| WO | 2008121945 A2 | 10/2008 |
| WO | 2013053407 | 4/2013 |
| WO | 2013053407 A1 | 4/2013 |
| WO | 2014088912 A1 | 6/2014 |
| WO | 2015027828 A1 | 3/2015 |
| WO | 2016020660 | 2/2016 |
| WO | 2016020660 A1 | 2/2016 |
| WO | 2019243579 A1 | 12/2019 |
| WO | 2020021100 A1 | 1/2020 |

OTHER PUBLICATIONS

United States Patent and Trademark Office, Non-Final Office Action, Aug. 3, 2023, 49 pages.

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

European Patent Office, Extended European Search Report for Application No. 20193124.3, Jan. 22, 2021, 11 pages., Germany.

Stephen Moskal et al., Cyber threat assessment via attack scenario simulation using an integrated adversary and network modeling approach, The Journal of Defense Modeling and Simulation: Applications, Methodology, Technology, vol. 15, No. 1, Aug. 15, 2017, pp. 13-29.

United States Patent and Trademark Office, Non-Final Office Action, Sep. 29, 2022, 87 pages.

Gharan, Shayan Oveis, "Lecture 11: Clustering and the Spectral Partitioning Algorithm" May 2, 2016, 6pp.

Nikolystylfw, "Can Senseon beat Darktrace at its very own game with its 'An I triangulation' modern technology?" Dec. 22, 2018, nikolystylfw.

(56)                    References Cited

OTHER PUBLICATIONS

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019," Jun. 3, 2019.

Senseon Tech Ltd., "Technology,".

Senseon Tech Ltd., "Senseon & You,".

Senseon Tech Ltd., "Technology Overview,".

Senseon Tech Ltd., "Senseon Enterprise,".

Senseon Tech Ltd., "Senseon Pro,".

Senseon Tech Ltd., "Senseon Reflex,".

Israeli Patent Offce, Notice of Deficiencies for Patent Aplication 276972 ; 4 pp. Aug. 22, 2021.

United States Patent and Trademark Office, Non-Final Office Action, Feb. 1, 2024 45 pages.

United States Patent and Trademark Office, Final Office Action, Aug. 22, 2024, 28 pages.

Moskal Stephen et al: "Context Model Fusion for Multistage Network Attack Simulation", 2014 IEEE Military Communications Conference, IEEE, Oct. 6, 2014 (Oct. 6, 2014), pp. 158-163, XP032686457, DOI: 10.1109/MILCOM.2014.32.

European Patent Office, Communication Pursuant to Article 94(3) EPC, 36 pp, dated Nov. 21, 2024.

Darktrace, "Darktrace Attack Path Modeling: Utilizing Graph Theory to derive multi-domain, risk-prioritized attack paths within computer networks," Feb. 23, 2022, 11 pages, Darktrace, Cambridge, United Kingdom.

Darktrace, "Darktrace Releases Attack Path Modeling Research," Feb. 23, 2022, 2 pages, Darktrace, Cambridge, United Kingdom.

Robbins, "BloodHound: How Graphs Changed the Way Hackers Attack," GraphConnect, Oct. 2017, 10 pages, New York City.

TrendMicro, "Online Phishing: How to Stay Out of the Hackers' Nets," Nov. 20, 2019, 10 pages, TrendMicro.

Fugue et al., "The State of Cloud Security 2021," 2021, 19 pages.

IBM, "X-Force Threat Intelligence Index," 2021, 50 pages.

Krebs, "'Blackhole' Exploit Kit Author Gets 7 Years," Apr. 14, 2016, 3 pages, KrebsonSecurity.

Dijkstra, "A Note on Two Problems in Connexion with Graphs," 1959, Numerische Mathematik 1, pp. 269-271, Amsterdam.

International Search Authority, International Search Report and Written Opinion, 12pages.

John Seymour et al: "Generative Models for Spear Phishing Posts on Social Media", arxiv.org, Cornell University Library, 201 Olin Library Cornell University Ithaca, NY 14853, Feb. 14, 2018 (Feb. 14, 2018), XP081222023.

Caithness, Neil, "Supervised/unsupervised cross-over method for autonomous anomaly classification," Oct. 25, 2019, CAMLIS 2019.

Marwan El-Gendi, "Red teaming 101: An introduction to red teaming and how it improves your cyber security," PwC United Kingdom, 8 pages.

Nist Computer Security Resource Center, "Red Team—Glossary", 2 pages.

United States Patent and Trademark Office, Non-Final Office Action, dated Aug. 3, 2023, 49 pages.

United States Patent and Trademark Office, Non-Final Office Action, Feb. 28, 2025 61 pages.

United States Patent and Trademark Office, Final Office Action, May 29, 2025 28 pages.

United States Patent and Trademark Office, Non-Final Office Action, Sep. 3, 2025, 9 pages.

United States Patent and Trademark Office, Non-Final Office Action, Sep. 16, 2024, 27 pages.

European Patent Office, Supplementary European Search Report, 16pp., Oct. 12, 2024.

United States Patent and Trademark Office, Final Office Action, dated Apr. 11, 2025, 32 pages.

Patent Cooperation Treaty, International Search Report, Dec. 6, 2022, 2pp.

* cited by examiner

CYBER SECURITY SYSTEM UTILIZING INTERACTIONS BETWEEN DETECTED AND HYPOTHESIZE CYBER-INCIDENTS

RELATED APPLICATION

This non-provisional application claims priority to under 35 USC 119 and the benefit of U.S. provisional patent application titled "A CYBER SECURITY APPLIANCE AND OTHER SECURITY TOOLS," filed Jul. 7, 2021, application No. 63/219,026, as well as U.S. provisional patent application titled "SECURITY TOOLS," filed Nov. 1, 2021, application No. 63/274,376, as well as U.S. provisional patent application titled "A CYBER SECURITY SYSTEM," filed Mar. 7, 2022, application No. 63/317,157, and claims priority as a continuation-in-part patent application under 35 USC 120 to patent application titled "AN ARTIFICIAL INTELLIGENCE ADVERSARY RED TEAM," filed Feb. 26, 2021, application Ser. No. 17/187,373, which claims priority as a continuation-in-part application claims priority to and the benefit of under 35 CFR 120 of U.S. non-provisional patent application "AN INTELLIGENT ADVERSARY SIMULATOR," filed Aug. 27, 2020, application Ser. No. 17/004,392, which claims priority to and the benefit of under 35 CFR 119 of U.S. provisional patent application titled "ARTIFICIAL INTELLIGENCE BASED CYBER SECURITY SYSTEM," filed Aug. 29, 2019, application No. 62/893,350, as well as also claims priority to and the benefit of under 35 CFR 119 of U.S. provisional patent application titled "An Artificial Intelligence Based Cyber Security System," filed Feb. 28, 2020, application No. 62/983,307, which are all incorporated herein by reference in their entirety.

NOTICE OF COPYRIGHT

FIELD

Embodiments of the design provided herein generally relate to a cyber security detection system. In several embodiments, one or more artificial Intelligence (AI) processes may be implemented with an AI based cyber security system having a simulation module, an attack path modeling module and an autonomous response module to protect a network against cyber-threats, one or more machine learning algorithms and a cyber security appliance.

BACKGROUND

In a cyber security environment, firewalls, security and scanning methods, and other detection and defense tools may be deployed to enforce specific policies and scan for vulnerabilities in order to provide protection against certain threats on such environment. These tools currently form an important part of an organization's cyber defense strategy, but they are insufficient in the new age of cyber threat. For example, existing methods for vulnerability scanning processes are typically performed by humans are less targeted and may lead to security resource allocation in the wrong places and so on. Also, some vulnerability scanners and simulators actually test and compromise the actual network devices themselves, which may adversely affect the network and the organization during this testing and scanning.

Existing cyber threat protection systems also generally ingest connectivity data to detect cyber threats in a passive way to access simulations of how a cyber threat might impact an organization's defences. For example, an organization may typically hire a human red team of cyber security professionals to test a defense system's vulnerability to cyber-attacks through various passive simulations. However, these human red team security professionals are usually very expensive to hire for most organizations. In addition, the human red team security professionals test the defense systems for one or more generalized vulnerabilities of the organization, without focusing on any specific defense systems, users, or attack simulations, nor offering any customizable attack simulations based on the specific organization and its specific users and entities. Accordingly, these existing tools such as the vulnerability scanners and simulators are failing to deal with new cyber threats because the traditional approach relies on being able to test and identify any vulnerabilities by gathering ingested data through various passive and generalized simulations.

The reality is that modern threats bypass these existing tools and protection systems on a daily basis. Such tools and protection systems need a new tool and protection system based on a new approach that may complement them and mitigate their deficiencies at scale across the entirety of digital organizations. In the complex modern world, it is advantageous that the approach is fully automated as it is virtually impossible for humans to sift through the vast amount of security information gathered each minute within a digital business and then to passively simulate vulnerabilies based on that information. In particular, a protection system that can particularly identify how vulnerable any of those identified simulations is needed. Such that the detection system may be used to identify any specific vulnerabilities in a proactive way that provides full awareness of vulnerabilities to that specific organization in light of its specific users and specific entities instead of the existing detection systems that are being used.

SUMMARY

In an embodiment, an apparatus is disclosed. The apparatus may include a set of modules and artificial intelligence models configured to detect a cyber incident. The apparatus can include a simulator configured to simulate an actual cyber attack of the cyber incident on a network including physical devices being protected by the set of modules and artificial intelligence models configured to detect the cyber incident; and an interaction and a feedback loop between i) the set of modules and artificial intelligence models configured to detect a cyber incident and ii) the simulator configured to simulate the attack of the cyber incident on the network including physical devices being protected by the set of modules and artificial intelligence models configured to detect the cyber incident during an ongoing detected cyber incident. A threat detection module can be configured to feed details from a detected incident into an attack path modeling module which then feeds into a simulator. Any software instructions forming part of the set of modules, the artificial intelligence models, and the simulator are stored in an executable form in one or more memories and executed by one or more processors.

In some embodiments, the simulator is configured to construct a graph of a virtualized instance of the network including i) the physical devices connecting to the virtualized instance of the network as well as ii) connections and pathways through the virtualized instance of the network. The simulator is configured to run the one or more hypothetical simulations of the detected incident to calculate one or more paths of least resistance from the virtualized instance of a source device through to other virtualized instances of components of the network until reaching an end goal of each hypothetical simulation of the detected incident, but not calculate every theoretically possible path from the virtualized instance of the source device to the end goal of each hypothetical simulation of the detected incident.

In some embodiments, the simulator is further configured to prioritize which devices connecting to the virtualized instance of the network should have a priority to allocate security resources to them based on results of the one or more hypothetical simulations of the detected incident.

The simulator can be configured to construct the graph of the virtualized network, with its nets and subnets, in which two or more of the devices connecting to the virtualized network are assigned with different weighting resistances to malicious compromise from the one or more hypothetical simulations based on the actual cyber attack of the cyber incident on the virtualized instance of the network.

The simulator can further be configured to run a single hypothetical simulation based on the actual cyber attack of the cyber incident on the virtualized instance of the network in order to calculate a set of paths of possible cyber attack propagation in the network if no autonomous response action is taken in response to the actual cyber attack of the cyber incident.

Further, the simulator can be configured to calculate, based at least in part on the results of the one or more hypothetical simulations, a risk score for each device, the risk score being indicative of a possible severity of the compromise if no autonomous response action is taken in response to the actual cyber attack of the cyber incident.

In some embodiments, once the simulator runs the one or more hypothetical simulations, a pattern of life, conditions, and indicators in the network are recorded to show what indicators and level of detected cyber incident would have been needed to trigger the autonomous response action.

The simulator can further be configured to increase a risk score associated with a first device based at least in part on: a determination that the first device has been a target in past cyber attacks, the first device is in connection with a second device which is designated as essential to the network, and the first device is in connection with at least one device with a risk score over a pre-defined threshold risk score.

The simulator can be configured to run the one or more hypothetical simulations of the detected incident to calculate one or more paths of least resistance for each hypothetical simulation to compromise 1) a virtualized instance of a source device, originally compromised by the cyber incident, 2) through to other virtualized instances of components of the virtualized network, 3) until reaching an end goal of the hypothetical simulation in the virtualized network, all based on historic knowledge of connectivity and behavior patterns of users and devices within the network under analysis.

According to some embodiments, a method for predicting an autonomous response to a detected cyber incident is disclosed. The method can include configuring a set of modules and artificial intelligence models to detect a cyber incident. The method can include configuring a simulator to simulate an actual cyber attack of the cyber incident on a network including physical devices being protected by the set of modules and artificial intelligence models configured to detect the cyber incident; and a feedback loop between i) the set of modules and artificial intelligence models configured to detect a cyber incident and ii) the simulator configured to simulate the attack of the cyber incident on the network including physical devices being protected by the set of modules and artificial intelligence models configured to detect the cyber incident during an ongoing detected cyber incident. The method includes configuring an attack path modeling module to feed details of a detected incident by a cyber threat module into an input module of the simulator and run one or more hypothetical simulations of that detected incident in order to predict and control an autonomous response to the detected incident. Any software instructions forming part of the set of modules, the artificial intelligence models, and the simulator are stored in an executable form in one or more memories and executed by one or more processors.

In some embodiments, the method can include configuring the simulator to construct a graph of a virtualized instance of the network including i) the physical devices connecting to the virtualized instance of the network as well as ii) connections and pathways through the virtualized instance of the network. The method can include configuring the simulator to run the one or more hypothetical simulations of the detected incident to calculate one or more paths of least resistance from the virtualized instance of a source device through to other virtualized instances of components of the network until reaching an end goal of each hypothetical simulation of the detected incident, but not calculate every theoretically possible path from the virtualized instance of the source device to the end goal of each hypothetical simulation of the detected incident.

In some embodiments, the method can include configuring the simulator to prioritize which devices connecting to the virtualized instance of the network should have a priority to allocate security resources to them based on results of the one or more hypothetical simulations of the detected incident.

The method can include configuring the simulator to construct the graph of the virtualized network, with its nets and subnets, in which two or more of the devices connecting to the virtualized network are assigned with different weighting resistances to malicious compromise from the one or more hypothetical simulations based on the actual cyber attack of the cyber incident on the virtualized instance of the network.

The method can further include configuring the simulator to run a single hypothetical simulation based on the actual cyber attack of the cyber incident on the virtualized instance of the network in order to calculate a set of paths of possible cyber attack propagation in the network if no autonomous response action is taken in response to the actual cyber attack of the cyber incident.

Further, the method can include configuring the simulator to calculate, based at least in part on the results of the one or more hypothetical simulations, a risk score for each device, the risk score being indicative of a possible severity of the compromise if no autonomous response action is taken in response to the actual cyber attack of the cyber incident.

The method can include configuring the simulator to increase a risk score associated with a first device based at least in part on: a determination that the first device has been a target in past cyber attacks, the first device is in connection with a second device which is designated as essential to the network, and the first device is in connection with at least one device with a risk score over a pre-defined threshold risk score.

The method can further include configuring the simulator to run the one or more hypothetical simulations of the detected incident to calculate one or more paths of least resistance for each hypothetical simulation to compromise 1) a virtualized instance of a source device, originally compromised by the cyber incident, 2) through to other virtualized instances of components of the virtualized network, 3) until reaching an end goal of the hypothetical simulation in the virtualized network, all based on historic knowledge of connectivity and behavior patterns of users and devices within the network under analysis According to yet another embodiment, a non-transitory computer readable medium in an apparatus is disclosed. The one or more computer readable codes may be operable, when executed by one or more processors, to instruct the apparatus to perform the method predicting an autonomous response to a detected cyber incident.

These and other features of the design provided herein may be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
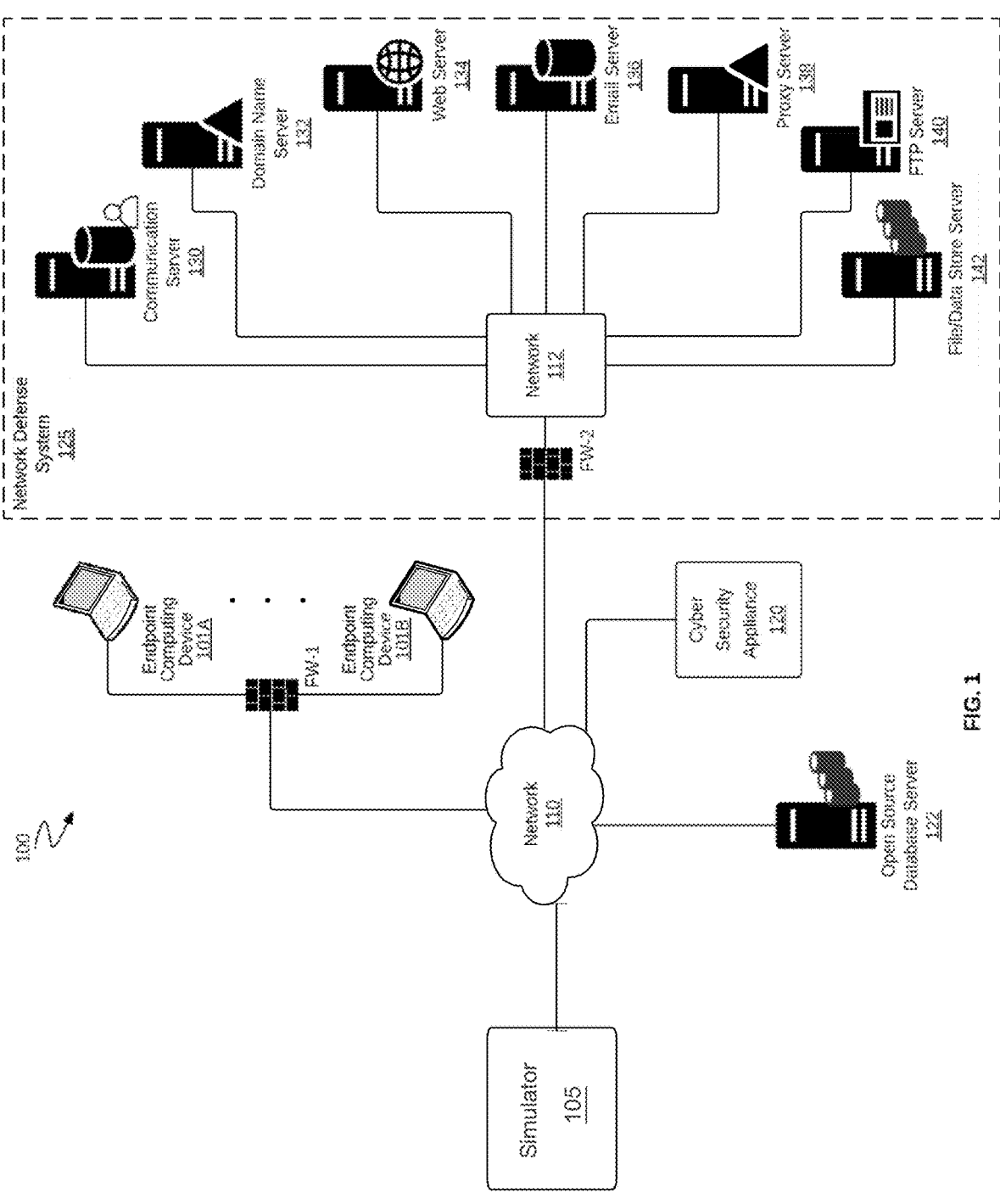
FIG. 1 illustrates a block diagram of an AI based cyber security system having a set of modules configured to cooperate with a cyber security appliance to predict an autonomous response to a detected cyber incident, in accordance with an embodiment of the disclosure.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

Various embodiments disclose cooperation of different defense systems, including a simulator and a set of modules to help an autonomous response module to take suitable defensive actions in case of cyber incidents. In some embodiments, occurrence of one or more events can trigger off the set of modules' investigation. While separate events can trigger the set of modules, a single incident can also trigger set of modules. In response, the set of modules can trigger off a simulator that can activate an autonomous response action against the event(s).

In general, the embodiments described herein include an artificial intelligence based cyber security system and method for predicting and/or controlling an autonomous response to a detected cyber incident, which are used to protect an organization such as a company, a client, etc., and all of the entities of the organization (e.g., such entities may be any email and network devices, endpoint devices, network servers and databased, network addresses, user agents, domain addresses, file directories, communication ports, analysts, end users, etc.). When initial signs of anomalous activity, e.g., a cyber-incident, are identified on devices, defense systems can be used to block further activity, preventing further compromise. However, to demonstrate the value of such systems, it would be useful to identify the possible compromises that have been prevented. By combining knowledge of the specific blocks applied (e.g. on particular ports) with a graph of possible paths of compromise within the network, specific paths of possible lateral movement that have been prevented by the blocking action can be identified.

On a high level, the cyber security appliance can use the simulator to provide a best remediation approach factoring in all of 1) a type of cyber threat infecting, 2) at different points within a network (e.g. at an edge of the network or somewhere within the network), 3) a determined level of severity for that threat, and 4) what autonomous action(s) are taken on potentially multiple different devices within the network. The cyber security appliance can provide a best remediation approach by running multiple models simulating a same attack but with different factors applied in order to predict the effects and outcomes of the attack with these different factors. The cyber security appliance can then intelligently present all of this information to an end user so they can set up the best remediation approach for that network. This can be a proactive cyber security approach, in which the cyber threat need not have previously detected.

In various embodiments, the cyber security appliance may include a set of modules and artificial intelligence models cooperating with a simulator. The simulator can map possible routes of lateral movement, which can be used in two ways: The first aspect is that if an autonomous response action is taken to neutralize the cyber attack, possible attack paths generated by running various hypothetical simulations can be overlaid to show the routes the attack could have proceeded had it not been stopped by the autonomous response action. This can be done in a visual way, e.g., with a graph displaying how the path was cut, or by metrics of protection/potential impact of the compromise calculated by the simulator.

The second aspect is that if the user has access to such potential routes as detected by the simulator, the user can preemptively "heal" the network by taking a defensive action based upon those paths. For example, the user can take action against the initial compromised device, e.g., block all outgoing data, but also apply an action to the nodes that the compromised device can get to, against that device, e.g., block the public IP of that device from logins to Office 365™, block VPN users from connecting to that device through Zscaler™ Firewall, block incoming connections on other devices from that device's IP, etc.

If no autonomous response has been taken yet, the simulator can overlap the one hypothetical simulations with attack paths in graph format. Then, the simulator can know the potential onward routes for an attacker. For example, if device A was identified as compromised by the set of modules, the simulator can calculate from known attack paths the routes the attacker could take laterally from device A, and how fast/easily they could compromise key assets. This allows the simulator to estimate an additional risk or severity score from the combined data; a high risk score is one where the confirmed compromise sits on a device or credential with a stronger ability to compromise more entities as detected by the set of modules, and with shorter paths to key assets.

The cyber security appliance can allow the end users to establish a priori remediation of cyber threats by performing testing via attack simulation, predicting effects, comparing effects, applying artificial intelligence to evaluate the predicted effects what's going to happen in this client's system actual system, and compare those effects from multiple simulations modeling an attack and then presenting that analysis in an intelligent manner to the end user. This is merely an example of how the cyber security appliance can do prediction about a known or unknown cyber threat so that upon actual detection of cyber threat attacking the organization's network, then a best choice to be taken for the autonomous action response on the correct one or more devices to best remediate the detected cyber threat while minimizing an effect on the remainder of the devices in the network.

Although upon detecting signs of anomalous activity, the set of modules itself can direct and cause an autonomous action response to block further malicious activity, however, to demonstrate the value of such defensive systems and increase the value of such autonomous actions, it would be useful to identify the possible compromises that have been prevented and/or how intelligent autonomous actions can mitigate a cyber threat while still allowing other devices in the network to be minimally affected by the autonomous actions taken. For example, if a cyber incident is detected, an autonomous action might be to isolate the network from all external contact and remove permissions to areas in the network with sensitive and/or vital information. Although this is a possible autonomous action to take, this may not be the best autonomous action.

FIG. 1 illustrates a block diagram of an AI based cyber security system having a set of modules configured to cooperate with a cyber security appliance to predict an autonomous response to a detected cyber incident, in accordance with an embodiment of the disclosure. As shown, the AI based cyber security system 100 having a simulator 105 which is communicatively coupled to a cyber security appliance 120, an open source (OS) database server 122, one or more endpoint computing devices 101A-B, and a network defense system 125 with one or more entities 130-142, over one or more networks 110/112, is shown, in accordance with an embodiment of the disclosure. As described above, the AI based cyber security system 100 may cooperate with the simulator 105 to simulate an actual cyber attack of the cyber incident on a network including physical devices being protected by the set of modules and artificial intelligence models configured to detect the cyber incident.

Figure 2:
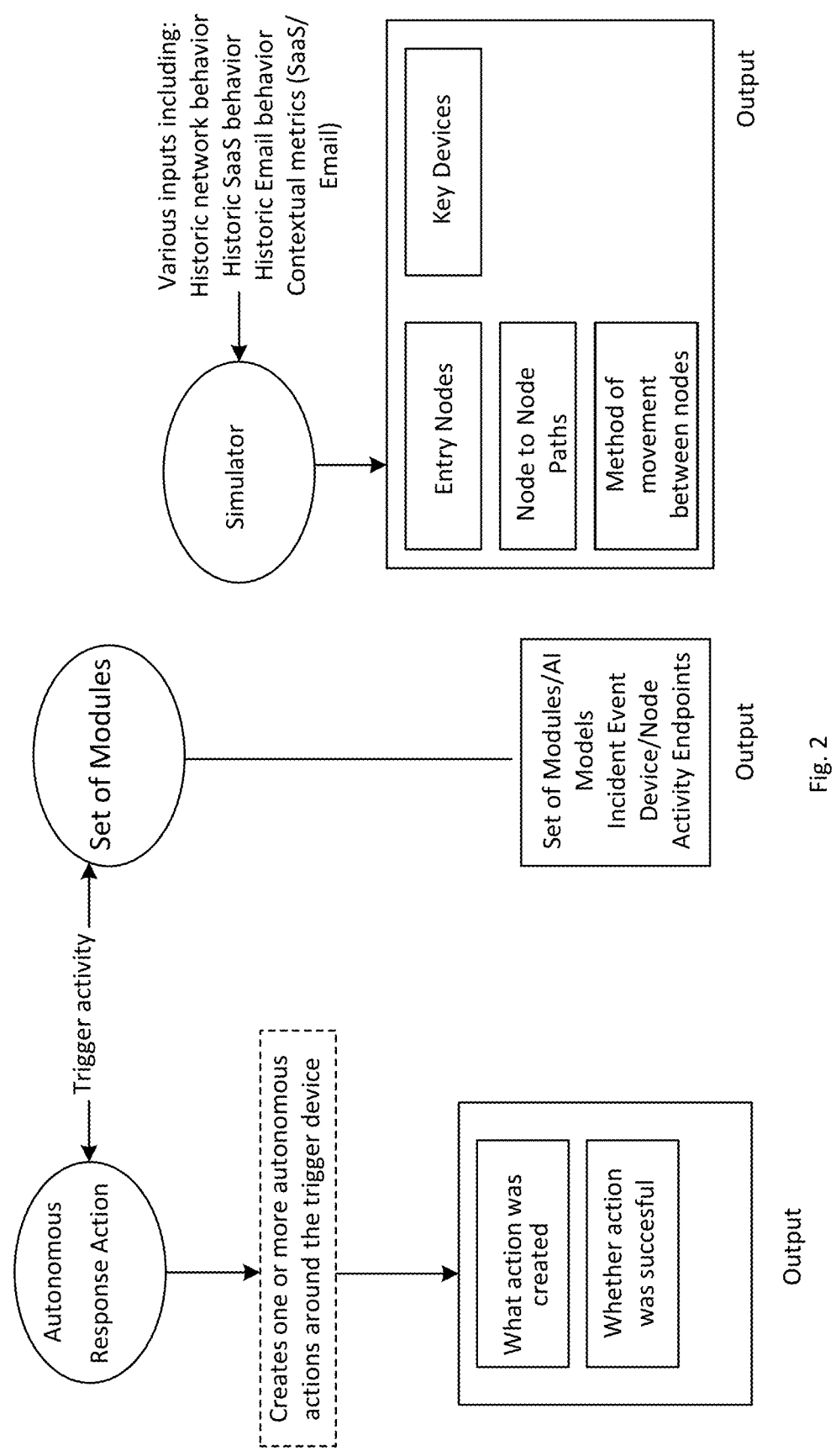
FIG. 2 illustrates a block diagram of various datasets of an AI based cyber security system having a set of modules configured to cooperate with a cyber security appliance to predict an autonomous response to a detected cyber incident, in accordance with an embodiment of the disclosure.
Figure 3:
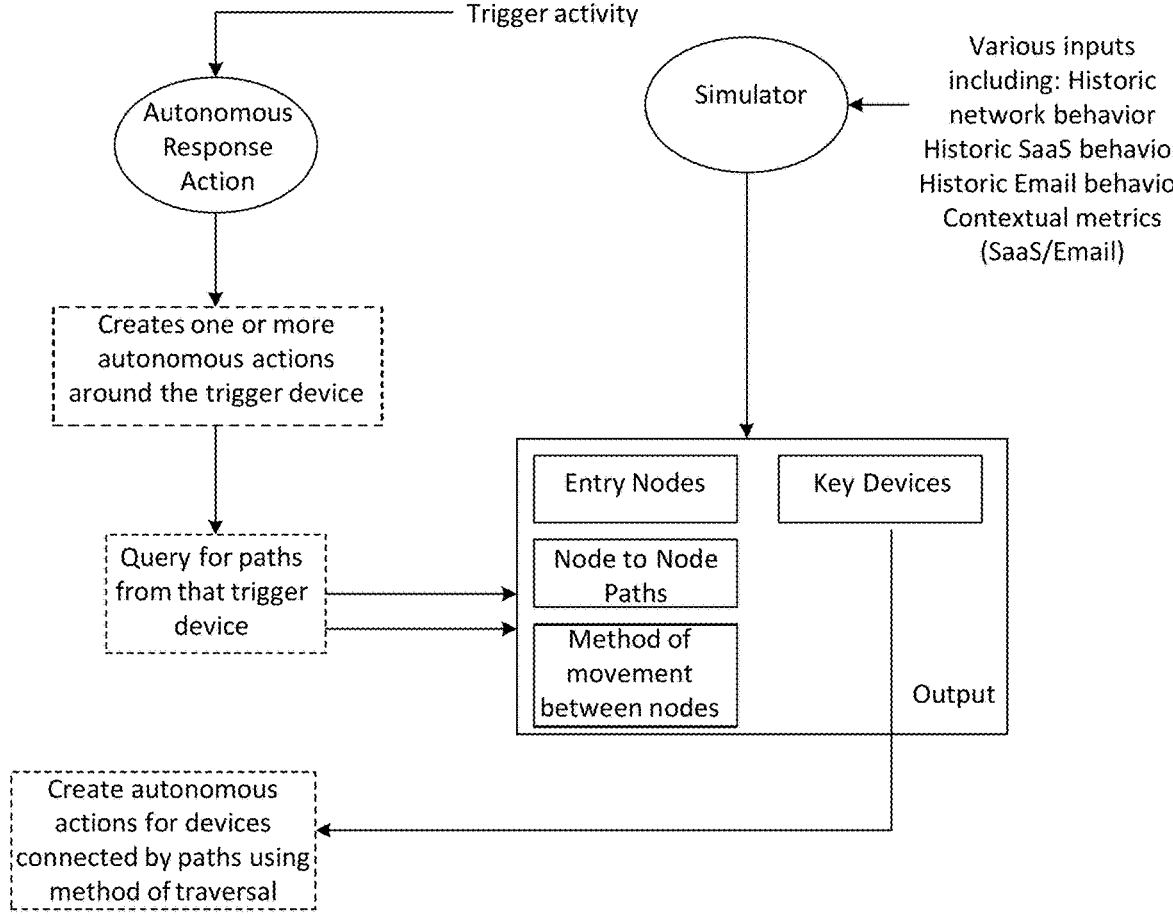
FIG. 3 illustrates a block diagram of an autonomous response action taken by the simulator of an AI based cyber security system having a set of modules configured to cooperate with a cyber security appliance to predict an autonomous response to a detected cyber incident, in accordance with an embodiment of the disclosure.
Figure 4:
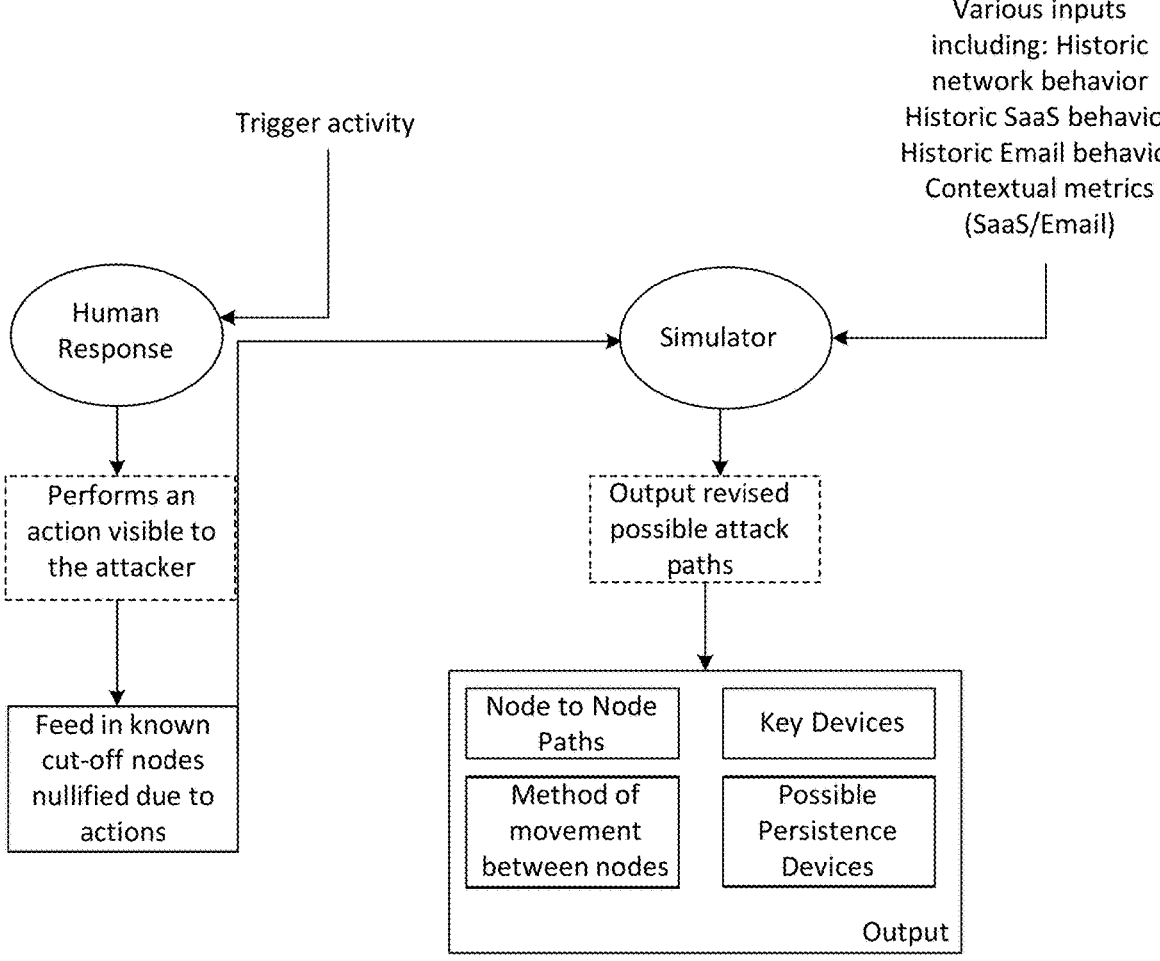
FIG. 4 illustrates a block diagram of an AI based cyber security system having a set of modules configured to cooperate with a cyber security appliance to predict an autonomous response to a detected cyber incident and its performance once the AI based cyber security system takes an autonomous response action visible to the attacker, in accordance with an embodiment of the disclosure.
Figure 5:
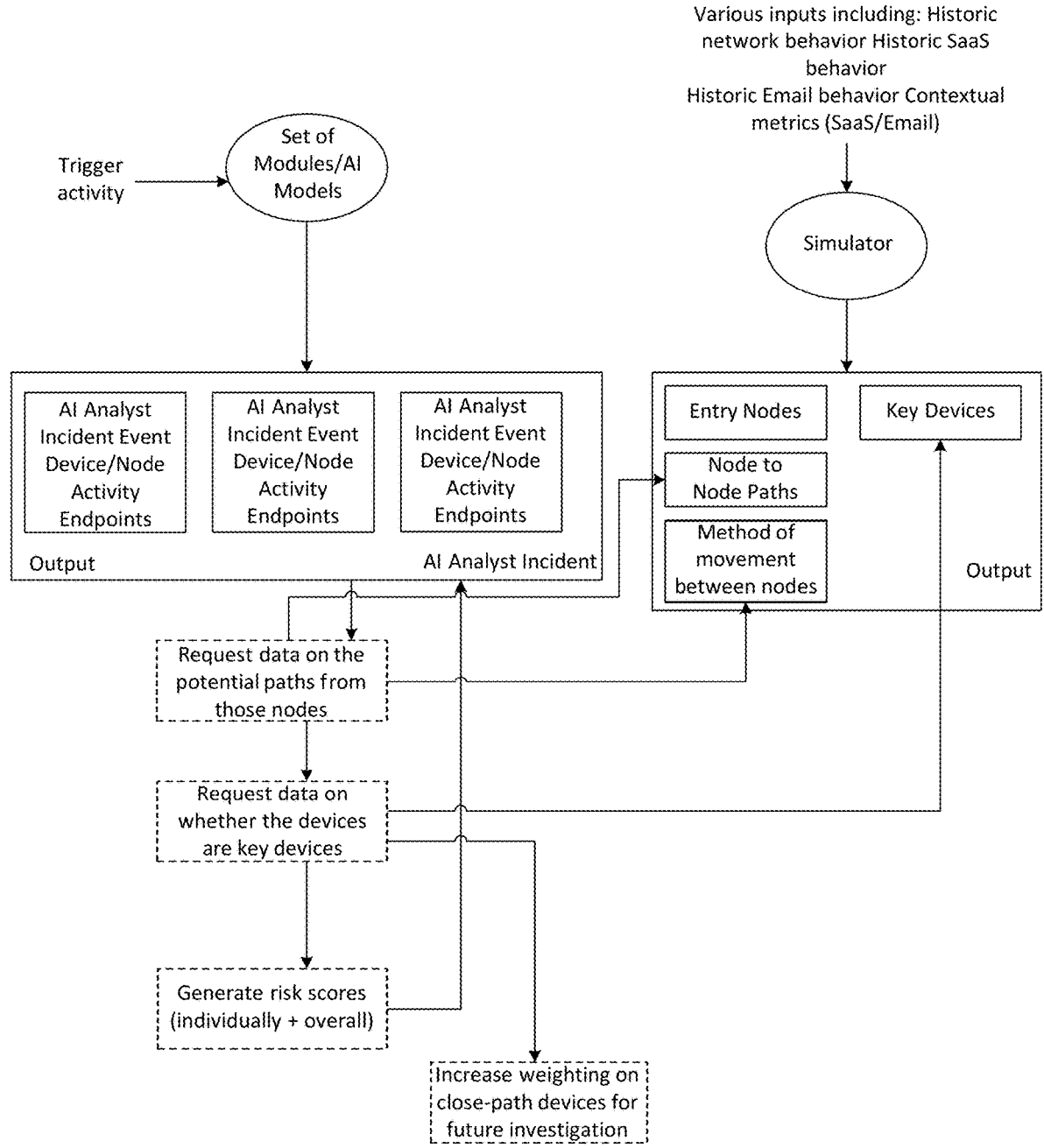
FIG. 5 illustrates a block diagram of the interactions between the simulator and the set of modules and artificial intelligence models of an AI based cyber security system having a set of modules configured to cooperate with a cyber security appliance to predict an autonomous response to a detected cyber incident, in accordance with an embodiment of the disclosure.
Figure 6:
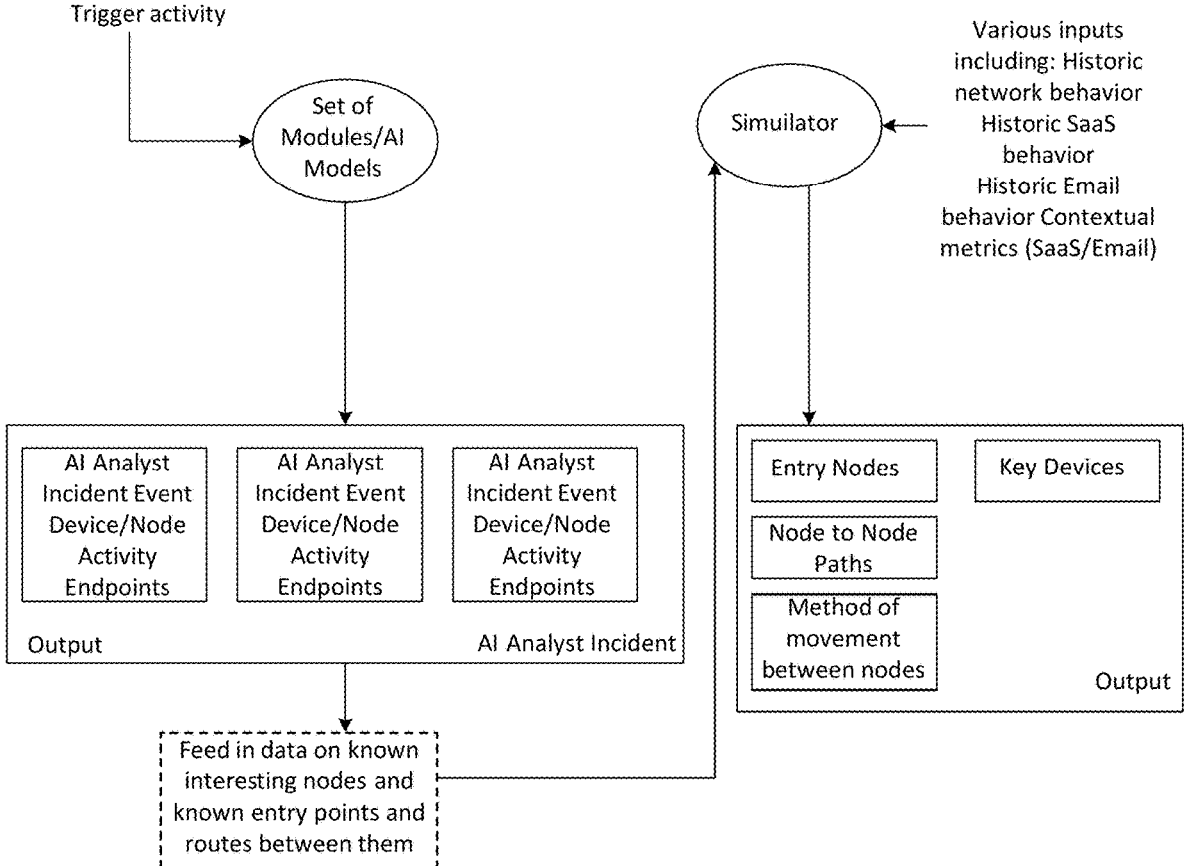
FIG. 6 illustrates a block diagram of a feedback loop between the set of modules and the artificial intelligence models and the simulator of an AI based cyber security system having a set of modules configured to cooperate with a cyber security appliance to predict an autonomous response to a detected cyber incident, in accordance with an embodiment of the disclosure.

FIGS. 2-6 illustrate various aspects and components of the present disclosure. In particular, FIG. 2 illustrates a block diagram of various datasets of an AI based cyber security system having a set of modules configured to cooperate with a cyber security appliance to predict an autonomous response to a detected cyber incident, in accordance with an embodiment of the disclosure. FIG. 3 illustrates a block diagram of an autonomous response action taken by the simulator of an AI based cyber security system having a set of modules configured to cooperate with a cyber security appliance to predict an autonomous response to a detected cyber incident, in accordance with an embodiment of the disclosure. FIG. 4 illustrates a block diagram of an AI based cyber security system having a set of modules configured to cooperate with a cyber security appliance to predict an autonomous response to a detected cyber incident and its performance once the AI based cyber security system takes an autonomous response action visible to the attacker, in accordance with an embodiment of the disclosure. FIG. 5 illustrates a block diagram of the interactions between the simulator and the set of modules and artificial intelligence models of an AI based cyber security system having a set of modules configured to cooperate with a cyber security appliance to predict an autonomous response to a detected cyber incident, in accordance with an embodiment of the disclosure. FIG. 6 illustrates a block diagram of a feedback loop between the set of modules and the artificial intelligence models and the simulator of an AI based cyber security system having a set of modules configured to cooperate with a cyber security appliance to predict an autonomous response to a detected cyber incident, in accordance with an embodiment of the disclosure. The description that follows can be understood best with reference with FIGS. 2-6.

The AI based cyber security system 100 may further include a set of modules and artificial intelligence models to detect a cyber incident, and a feedback loop between i) the set of modules and artificial intelligence models to detect a cyber incident and ii) the simulator to simulate the attack of the cyber incident on the network including physical devices being protected by the set of modules and artificial intelligence models to detect the cyber incident during an ongoing detected cyber incident. An attack path modeling module of the set of modules can feed details of a detected incident by a cyber threat module into an input module of the simulator 105 and run one or more hypothetical simulations of that detected incident in order to predict and control an autonomous response to the detected incident. It should be noted, any software instructions forming part of the set of modules, the artificial intelligence models, and the simulator are stored in an executable form in one or more memories and executed by one or more processors. Further, the attack path modeling module may potentially integrate the new data into the old data and based on the integrated data, generate an updated report.

In some embodiments, the AI based cyber security system 100 may cooperate with the simulator 105 to construct a graph of a virtualized instance of the network including i) the physical devices connecting to the virtualized instance of the network as well as ii) connections and pathways through the virtualized instance of the network. The simulator is configured to run the one or more hypothetical simulations of the detected incident to calculate one or more paths of least resistance from the virtualized instance of a source device through to other virtualized instances of components of the network until reaching an end goal of each hypothetical simulation of the detected incident, but not calculate every theoretically possible path from the virtualized instance of the source device to the end goal of each hypothetical simulation of the detected incident.

The AI based cyber security system 100 may further cooperate with the simulator 105 to construct the graph of the virtualized network, with its nets and subnets, in which two or more of the devices connecting to the virtualized network are assigned with different weighting resistances to malicious compromise from the one or more hypothetical simulations based on the actual cyber attack of the cyber incident on the virtualized instance of the network.

In some embodiments, the AI based cyber security system 100 may cooperate with the simulator 105 to prioritize which devices connecting to the virtualized instance of the network should have a priority to allocate security resources to them based on results of the one or more hypothetical simulations of the detected incident.

The AI based cyber security system 100 may cooperate with the simulator 105 to run the one or more hypothetical simulations of the detected incident to calculate one or more paths of least resistance for each hypothetical simulation to compromise 1) a virtualized instance of a source device, originally compromised by the cyber incident, 2) through to other virtualized instances of components of the virtualized network, 3) until reaching an end goal of the hypothetical simulation in the virtualized network, all based on historic knowledge of connectivity and behavior patterns of users and devices within the network under analysis. In other words, inputs from a real incident can be used to change what the simulator considers the overall situation. It should be noted that, as the ongoing detected incident is updated with new data, the questions asked from the simulator can change as well as the potential inputs to it. Thus, unlike the conventional simulation techniques, the exchanges between the AI based cyber security system 100 and the simulator 105 are dynamical and not static.

Further, the AI based cyber security system 100 may cooperate with the simulator 105 to calculate, based at least in part on the results of the one or more hypothetical simulations, a risk score for each device. The risk score can be indicative of a possible severity of the compromise if no autonomous response action is taken in response to the actual cyber attack of the cyber incident.

The AI based cyber security system 100 may also cooperate with the simulator 105 to run a single hypothetical simulation based on the actual cyber attack of the cyber incident on the virtualized instance of the network in order to calculate a set of paths of possible cyber attack propagation in the network if no autonomous response action is taken in response to the actual cyber attack of the cyber incident.

In some embodiments, once the simulator runs the one or more hypothetical simulations, a pattern of life, conditions, and indicators in the network are recorded to show what indicators and level of detected cyber incident would have been needed to trigger the autonomous response action.

The AI based cyber security system 100 may cooperate with the simulator 105 to increase a risk score associated with a first device based at least in part on: a determination that the first device has been a target in past cyber attacks, the first device is in connection with a second device which is designated as essential to the network, and the first device is in connection with at least one device with a risk score over a pre-defined threshold risk score.

In some embodiments, the AI based cyber security system 100 may cooperate with the simulator 105 to prioritize which devices connecting to the virtualized instance of the network should have a priority to allocate security resources to them based on risk scores calculated for each device during the one or more hypothetical simulations of the detected incident. For example, the simulator 105 may determine a device with a low risk score should be prioritize in protection against the cyber incident due to its connections to critical devices and accounts in the network or due to storing critical information. The critical information can be external critical information (e.g., confidential information of a client/user) or internal critical information (e.g., payroll information stored in HR servers).

Further, the simulator 105 can increase the risk score associated with a first device based at least in part on: a determination that the first device has been a target in past cyber-attacks, the first device is in connection with a second device which is designated as essential to the network, and the first device is in connection with at least one device with a risk score over a pre-defined threshold risk score.

The simulator 105 can calculate the amount of time that can take for the cyber-attack to spread from one node (i.e., device). Similarly, the simulator 105 can calculate the amount of time that can take for the cyber-attack to spread from via each edge/link.

In some embodiments, the simulator 105 may launch an autonomous response action which is hidden from the attacker. On the other hand, the simulator 105 may take an autonomous response action that is visible/sensible to the attacker. For example, the simulator 105 may remove access to certain nodes or edges of the network from the attacker. In response to noticing that the attacker has been exposed and countered by the simulator 105, the attacker would most probably try to change its strategy in infecting the network and propagation methods. Once the attacker becomes aware that it has been detected and the AI based cyber security system 100 and the simulator 105 are trying to fight it off, the attacker may change what it is doing so it might start trying to go for persistence, for example, to change the tools it is using, or change the targets. The attacker may also try to get to a domain controller. In such embodiments, the simulator 105 may use historic behavior of the attacker, or other attackers, in how they change their propagation methods when being exposed, and take suitable response accordingly. The simulator 105 may further may predict what the attacker may do to do lateral movements, or to try to get to a particular place (node) in the network as a goal. Additionally, any of the set of modules and the artificial intelligence models can predict where in the network the important events can happen, and thus, where the attacker likely to be trying to move to. The AI based cyber security system 100 and the simulator 105 may prioritize the nodes and edges that are vulnerable or should be protected against the attack and take suitable action to protect those prioritized nodes and edges first.

The simulator 105 can take suitable actions to stop the cyber-attack from propagating and further remediate the damages that has already happened and then use the knowledge to update the machine learning algorithms. Thus, in the future, once the simulator 105 queries the set of modules on how to face a possible cyber-attack, such knowledge will be used to effectively counter the possible cyber-attack. In various embodiments, the data analyzed by any of the modules will be circulated to every other modules as well, so the modules are updated simultaneously.

In some embodiments, the simulator 105 can identify the one or more critical devices connecting to the virtualized instance of the network that should have the priority to allocate security resources to them. The critical devices can be chosen to contain the possible spread as well as potentially insulating these yet-to-be-affected devices from an identified compromised device. The simulator can show both how bad it would be if these one or more devices were compromised and where the compromise would spread, as well as where would they go when potentially triggering downstream network autonomous actions/responses from the compromised device.

When modeling and simulating with the simulator 105, the simulator 105 may use an importance of a user and their corresponding device(s) in a hypothetical simulation based on the detected incident. The simulator 105 may use an importance of a user and their corresponding device(s) in a simulated attack analysis when modeling and simulating the incident. The user's importance may be conveyed by the set of modules and the artificial intelligence models into the attack simulator 105 in a number of ways, as described in details below.

The user's importance can be manually put in by a user of the simulator 105. The user can enter manually the title and importance of, for example, officers of the company and employees with high levels of administrative rights. The user's importance can be obtained by a visual scan of an organization chart supplied by a user of the simulator 105. A user importance metric for the attack path modelling can come from natural language processing. The importance of the user may be inputted by other techniques as well. Attack path modelling requires a concept of impact and of probability. Probability can be based on, for example, how frequently something is interacted with and how many clients it has connections to. A second component that can be factored for the risk calculation relates to impact and how important a user is an impact score. In contrast to the lateral movement probability, which is an edge property, impact is an intrinsic node property. Conceptually, this impact score should be representative of the resulting negative impact to the parent organization in the event that the node is compromised.

The importance of the user such as a job title can factored based on a known or deduced hierarchy. The simulator 105 can use job title information derived from/pulled in from a premise active directory, title based site such as LinkedIn, an ad service such as AD servers, pulled in information from service providers external IDaaS services like Okta, Duo, Jumpcloud, to derive level of "keyness," deduced by an AI classifier trained on job titles, etc. Natural language processing can be used to derive a seniority level and department from the job title text. This is combined with user hierarchy where derivable (for example, Microsoft Azure AD org chart feature). A list of predefined "key" job titles can also be used. This data is seeded into the simulator data to raise the importance of SaaS users and their associated devices when performing virtual attack scenarios (i.e., running a hypothetical simulation). This is compared to intelligence learning on organizational structures and their hierarchy titles. The simulator can also do some analysis on the source material with natural language process to derive the organizational hierarchy. The simulator can also apply image analysis in case the source material contains visual aspects such as an organizational chart system. For example, in Microsoft teams you can see an organizational chart and then derive the hierarchy and associate terms/titles with positional ranks within that hierarchy. Note, the system can also use human language translator if the source of the information is provided in a different human language, such a Russian, than the human language that the natural language engine was trained in, such as English. Devices associated with users whose title and/or position in the hierarchy of an organization will be given a higher risk metric if that device was compromised. These devices will show up as nodes will a higher importance/a key node in a graph used in, for example, the simulator.

As noted before, the simulator 105 can build a graph of nodes including who is a key user and what routes/attack paths needed to travel to the nodes. The simulator 105 can decide the impact level for node in the context of virtual attack simulations. The simulator 105 can feed information it determines back to the set of modules, as well as other parts of the product suite. Thus, the simulator 105 can identify individuals with more importance than others if compromised by a cyber incident and/or certain users to alter the autonomous response actions to take/restrict and mitigate when a cyber incident is detected against that node. Then, a run a simulation and determine the actual effect of the altered autonomous response taken compared to other responses that could be taken. The simulator 105 can identify individuals with more importance than others and thus their corresponding devices; as well as key servers to protect the network.

In some embodiments, an algorithmic approach can be used to decide what nodes in a network are of most importance. This is a way to detect key devices and/or key individuals via using, for example, a decay algorithm. Based on user-provided vulnerability scan results, and passive analysis of traffic, the AI based cyber security system can build a graph of entities in a digital estate, and the possible pathways of compromise between them. If users also seed this graph with the most institutionally important entities (e.g., those relating to high level managers, CTOs, COOs, etc.), then an importance score can be computed for each node in the graph using the following decay equation:

$$x_i = (x_{i-1} + c)^{\frac{1}{d}}$$

Where c and d are constants that can be scaled depending on network types. The algorithm for of propagation uses deques in order to maintain a O(n log(n)) time complexity. X is the score and i is the associated entity id. The series of ids comes from calculating all paths from the current node; if an id has a score associated with it; the score is propagated with the decay equation applied.

A measure of graph centrality, which is calculated by summing the number of times an id appears as a target from a list of edges, may also be used to determine an additional "keyness" score, identifying nodes that are most important to the estate, such as those associated with critical servers and sysadmins. These metrics can then be combined with pathfinding algorithms to determine the path from the most vulnerable entry points to the estate (e.g., nodes associated with externally facing servers, or human users), to the most important or most key nodes, establishing the paths of greatest possible vulnerability to the organization.

The simulator can look at the outputs of the hypothetical simulations and decide how to respond to the cyber-incident. The simulator can further query the set of modules and the artificial intelligence models for more information such as the already-compromised devices in order to calculate the risk score for each device and determine the suitable action in response to the cyber incident. Any new information gathered based on the hypothetical simulations can be used by the simulator to update artificial intelligence models by updating their respective weights. The updated (i.e., trained) artificial intelligence models will be able to take preemptive actions against similar cyber incidents in the future.

In some embodiments, the simulator can decide on possible response to a cyber incident based upon what has been achieved previously. That is, the decision can depend on the devices and accounts that are compromised, and methods similar cyber incidents have chosen to attack the network previously. This enables the simulator to analyze the potential damages to the network by a particular cyber incident and to choose the best course of action in order to counter such a cyber incident. As a non-limiting example, the simulator may determine that the risk score associated with a first device is too high, so that first device should be quarantined. As another non-limiting example, suppose the simulator determines that the risk score associated with a second device is not too high, i.e., does not pass the threshold risk score, which indicates that the second device need not be quarantined. However, running multiple hypothetical simulations gives the simulator a variety of potential response to be taken in response to the cyber incident. As such, the simulator may determine that the second device, even with a risk score below the threshold risk score, should be quarantined. Such an action can be due to a fact that the second device has been previously vulnerable to similar cyber incidents, to close to a key device, in some scenarios has been shown to be vulnerable to the cyber incidents, etc. As a result of such an enhanced analysis, the simulator can take more efficient responses to cyber incidents and minimize the potential damages that could happen in the absence of the autonomous response action.

By overlaying graphs of the network and the corresponding compromise when a same attack is occurring but different autonomous actions are taken and the corresponding textual analysis and level of threats needed to be detected, the simulator can provide valuable information to the end user. The multiple simulations modeling different things, e.g., factors actions taken, where and what actions taken, along with capturing what would need to be detected to detect the cyber threat and trigger the autonomous action, and then what effect on the network overall and to individual other users/devices in the network, provides sophisticated information presented to the end user. The end user can then run many simulation to model all these different scenarios and have the artificial intelligence show visually and textually what the end effects are, which can allow the end user to select a best autonomous action to set, what level of threat needed to trigger that autonomous action, what devices to take autonomous actions on including devices yet to be compromised by the cyber threat, etc.

Thus, by obtaining the output results and knowledge from multiple hypothetical simulations, the end user can do many beneficial actions. The end user can set up autonomous actions to take ahead of time on both not yet to be compromised devices and compromised devices based on actual predicted response remediation and the best approach for that network knowing what the effects are from taking multiple simulated approaches. The end user is also able to set up the defense of their network well ahead of any actual compromise by a cyber threat by using this informed report presented to the end user.

By combining knowledge of the specific blocks applied with a graph of possible paths of compromise within the network, the simulator 105 can identify specific paths of possible lateral movement that have been prevented by the blocking action. Graph data in a graph state with nodes and edges and possible paths of compromise can be determined and then used when compared to other possible scenarios. In other words, analyst data can be arranged into an interlinking graph of events and endpoints. To that end, the AI based cyber security system 100 may include a feedback loop between i) the set of modules and artificial intelligence models to detect a cyber incident and ii) the simulator to simulate the attack of the cyber incident on the network including physical devices being protected by the set of modules and artificial intelligence models to detect the cyber incident during an ongoing detected cyber incident. The feedback loop operates in a real-time, such that any incident detected by the set of modules and the artificial intelligence models is fed to the simulator in real-time and any result of any of the one or more hypothetical simulations is fed to the set of modules and the artificial intelligence models in real-time as well. This can ensure dynamic, real-time interaction between the set of modules and the artificial intelligence models and the simulator which enhances the efficiency of detecting, countering, treating and preventing cyber incidents.

Figure 7:
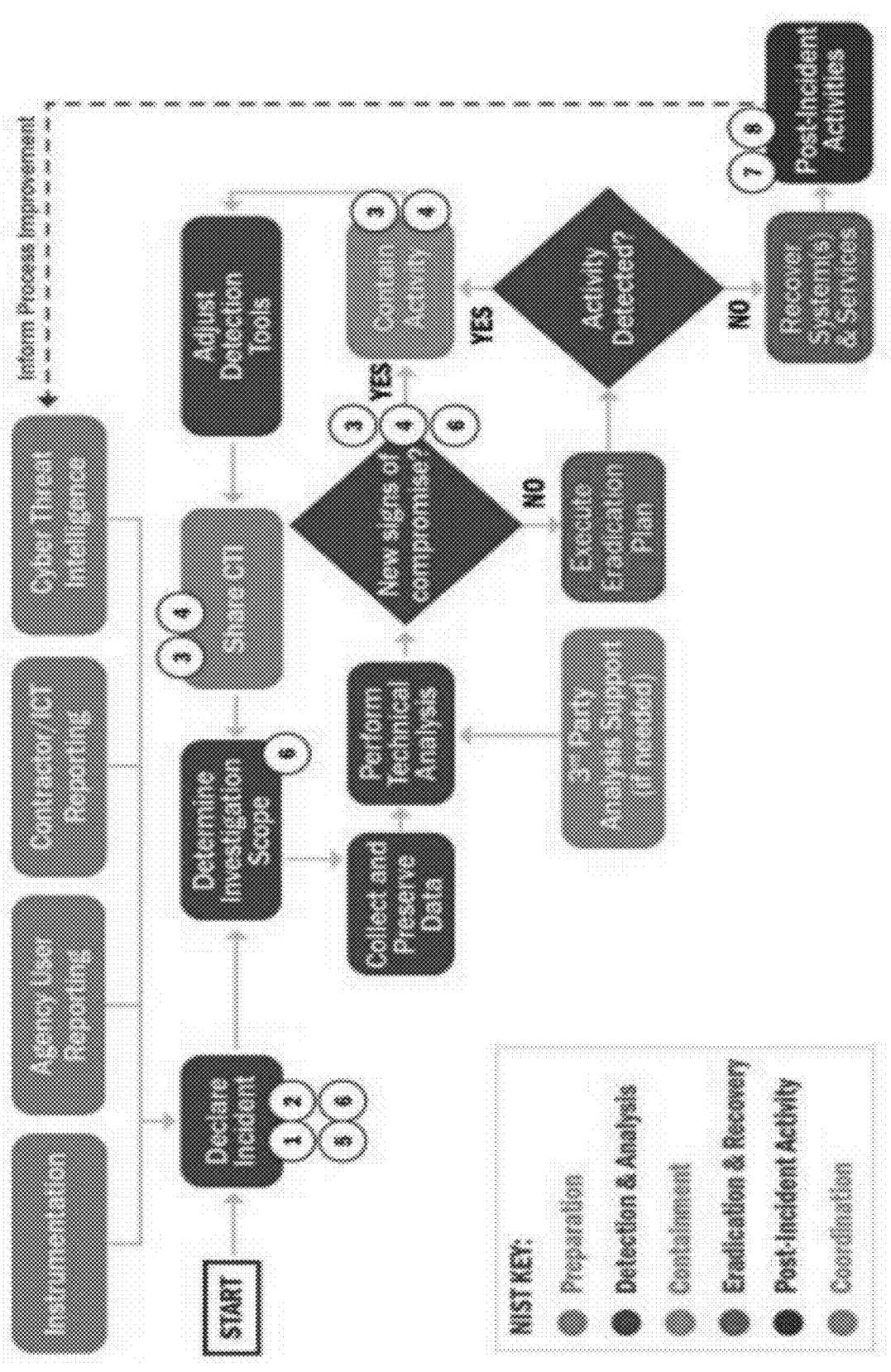
FIG. 7 illustrates an overview of various aspects of an AI based cyber security system having a set of modules configured to cooperate with a cyber security appliance to predict an autonomous response to a detected cyber incident, in accordance with an embodiment of the disclosure.

FIG. 7 illustrates an overview of various aspects of an AI based cyber security system having a set of modules configured to cooperate with a cyber security appliance to predict an autonomous response to a detected cyber incident, in accordance with an embodiment of the disclosure. To improve the efficiency of the AI based cyber security system, a reliable cyber AI loop requires the AI based cyber security system to: i) detect the cyber incident, which is to identify, investigate, and understand the full extent of a cyber incident, ii) respond to the cyber incident, which requires immediate treatments that pause or delay the problems caused by the cyber incident, iii) heal, which includes treatments, likely slower than the respond step, that return the network operations to a healthy state and avoid relapses, and iv) prevent, which includes to predict the next events in the incident and take measures to prevent them.

To achieve such an extended detection as in i) the AI based cyber security system can be able to consider the incident as a graph in which the nodes are denoting the physical devices, user accounts, and service, and in which the edges are actions and transactions between them. Such a graphical representation of the incident can significantly enhance the AI models and increases human understanding of the events and provides the user with a big picture of the operating network.

Similarly, to achieve such an extended detection as in ii) the AI based cyber security system can extend its existing autonomous response actions and related AI models on nodes and edges, and access a full incident context. The AI based cyber security system can further act by obtaining the user's confirmation or alternatively, be fully autonomous.

Additionally, in order to be able to heal the network upon infecting by the cyber threat, as in iii) the AI based cyber security system can run a diagnosis to determine the entities (nodes) involved, what damages to those entities has happened (i.e., edges), how to heal these damages, the order of healing those damages, and how much the AI based cyber security system can help to inform, arrange or action itself.

Similarly, in order to be able to prevent future cyber attacks as in iv) the AI based cyber security system can ask specific questions to run the hypothetical simulations regarding where the key event can happen (the nodes) and what methods can be used to propagate the attack (the edges). The AI based cyber security system can further determine that an attacked device may be likely a target of future attacks as well and prioritize its protection. Similarly, the AI based cyber security system can determine vulnerable groups of devices and prioritize their protection based on the fact that similar devices to one device of each of the vulnerable groups has already been attacked and therefore is at a higher risk, i.e., has a high task score. The AI based cyber security system can further determine that a known threat actor (a repeat attacker) has known techniques and targets and as a result, the AI based cyber security system can prioritize defending against such techniques and defending such targets for some time until the attacker is likely to have moved on or has changed their tools. Once confirmed that such a move on or such changes have occurred, the AI based cyber security system can lower the priority of the targets back to the normal.

Thus, AI based cyber security system can cooperate with the set of modules and the AI models and the simulator to continuously monitor the entire environment in the absence of incidents and interact with ongoing incidents, which can be a single coherent threat, and include either a small number of related events or a very large number of related events.

As noticed above, various embodiments extend all four aspects mentioned above by disclosing the AI based cyber security system cooperating with the set of modules and the AI models and the simulator to detect, based on interactions between the set of modules, the AI models and the simulator, an incident (e.g., an ongoing actual cyber threat). Actual feeding of the details of the detected incident into multiple hypothetical simulations of that incident will be performed by the simulator in order to predict and/or control the autonomous response to the detected incident as well as subsequently improve the detection of the cyber threat causing that ongoing attack. The attacker may possibly alter their plans in response to being detected and when the cyber threat causing that ongoing attack alters its attack progress through the network in response to actions caused by the autonomous response, the simulator is able to predict where and how the attacker makes their alterations, thus, suitable autonomous action can be taken. It should be noted that, all the detection and simulations occur in real-time (while the cyber attack is occurring) with machine learning models understanding while pulling information from the simulator running parallel simulations of the actual attack about what might happen in terms of what the cyber threat may do in response to the autonomous response and an impact on the network being protected.

The cyber security appliance 120 and/or the simulator 105 can use resource impact propagation, which can include a way to determine an ease of compromising a user through a poison file attack. The system can detect files that would be good candidates for compromising a user and also traverse all paths that the system wouldn't get through network traffic analysis. The system can factor how important nodes are based on what is discussed in where users and their devices are ranked based on their importance in the organization. Resources (on premises via SMB, through SaaS logs, etc.) observed in user activity are recorded. Resources can be ranked for their impact and ability to propagate. Resources with more than one user interacting, or users interacting who have a high impact score as derived based on user importance, can be considered high impact—either because they are gateways to key individuals/important people, amount of interactions with that file/document, content analysis of that file/document, a file location of where the file is found—finance folder and a finance file, and/or can be a gateway used for lateral movement. "Impact" can also be derived by Natural Language Processing analysis of the filename and file path.

A simplified approach to automated impact assignment by using propagation via shared resource access can begin with one high impact user—the CEO, and no prior information regarding the other users or files (assume no classification has been run on the filenames). The fact that only one user (other than the CEO) has access to "sensitive.xlsx" implies that this file may be high impact. Furthermore, some of that importance is also propagated from the CEO to the one other user that also has access to "sensitive.xlsx". In contrast to this, "boring.docx" is accessed by a large number of users alongside the CEO. As a result, the impact propagation from the CEO is diluted by the large number of other unknown impact users also having access. This impact propagation mechanism relies on the assumption of resource access segmentation assignment according to resource and/or user impact. The use of a poisoned resource (on premises or in a SaaS context) are also be covered here. The risk from replacing this resource is high.

Further, the set of modules' outputs can be supplied to the simulator which then can provide the user with a set of information that shows (i.e., predicts) possible scenarios that could happen when an autonomous action is applied at any particular stage, along with the resulting different path of lateral movement and overall compromise of the network. Such information can include a visual of the resulting different paths of lateral movement and overall compromise of the network when factoring in when a particular autonomous action is applied to mitigate the detected cyber threat. The information can be produced by running two types of simulations, one type of simulation to predict compromise with the autonomous action applied at a stage chosen by either the user or the machine learning algorithms, and one type of simulation to predict compromise without the autonomous action applied at that stage. However, each time in the simulation the pattern of life, conditions, and indicators are recorded and intelligently presented to show what indicators and level of detected threat would have been needed to trigger that autonomous action.

In some embodiments, the AI based cyber security system can enable the user to intelligently evaluate whether to make changes in setting or the level of detected threat to trigger each different autonomous action shown and at what stage shown through the information. Moreover, the information provided by the AI based cyber security system can also show what would happen if upon detecting the threat on a first device, the cyber security appliance takes autonomous actions on key devices that are not demonstrably compromised yet. Thus, what would happen if a cyber threat was detected on one or more devices in the network, what happens if autonomous actions are taken on device's yet to be compromised but these actions are being triggered to mitigate the cyber threat's impact on the network but trying to minimize inconvenience to other users of the network whose devices have not been compromised, and then the information showing the resulting different paths of lateral movement and overall compromise of the network when factoring in these autonomous actions on devices yet to be compromised at the time the cyber threat is detected on another device in the network.

In some embodiments, the AI based cyber security system 100 can include a user interface and a data management module residing in the simulator. The simulator 105, the cyber threat creator 106 and the data management module can cooperate with the data store and the user interface to record events in the cyber security appliance 120 and the network. The recorded events can include lateral movement and the set of devices and the set of user accounts compromised during the actual cyber threat attack in the network and actions taken by the cyber security appliance 120 to detect the actual cyber threat attack on the network, and actions taken by the cyber security appliance to mitigate the actual cyber threat attack.

In some embodiments, the user interface can be an application program interface. By recoding the network in operation, the user can monitor the events occurring inside the network in real-time while the network is running. The user can further extract information from the network through the user interface, e.g., API, and store the extracted information in a data store. The data store can be located outside the network, the cloud, local storage device, etc. The user interface can further display, on a display screen, the recorded events to a user and allow a user to watch and observe what is happening in the cyber security appliance and the network.

The AI cyber security system 100 may use any unusual detected behaviour deviating from the normal behaviour and then builds a sequence/chain of unusual behaviour and the causal links between the sequence/chain of unusual behaviour to detect any potential cyber threats. For example, AI cyber security system 100 may determine the unusual patterns by (i) filtering out what activities/events/alerts that fall within the window of what is the normal pattern of life for that network/system/entity/device/user under analysis; and (ii) then analysing the pattern of the behaviour of the activities/events/alerts that remain, after the initial filtering process, to determine whether that pattern is indicative of a behaviour of a malicious actor, such as a human, program, and/or any other cyber harmful threat. The AI cyber security system 100 may further return and retrieve some of the filtered out normal activities to help support and/or refute a possible hypothesis of whether that pattern is indicative of a behaviour of a malicious actor. For example, AI cyber security system 100 may use an analyser module (or the like) to cooperate with one or more AI models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Thereafter, the AI cyber security system 100 may also have a scoring module (or the analyser module itself) configured to assign a threat level score or probability indicative of what level of threat does this malicious actor pose (e.g., as shown with the scores depicted in the graph 600 of FIG. 6). Lastly, the AI cyber security system 100 may be configurable through the user interface, by a user, an analyst, and/or the like, used to establish one or more predetermined parameters (or inputs), if any, regarding what type of automatic response actions, if any, such modules in the AI cyber security system 100 should take when different types of cyber threats, indicated by the pattern of behaviours under analysis, are equal to and/or above a configurable threshold level of threat posed by this malicious actor.

As such, the endpoint devices 101A-B may be accessible and communicatively coupled to the cone creator 105, the cyber security appliance 120, and/or the entities 130-142 in the network defense system 125 via the network 110, the second firewall (FW-2) (or the front-end firewall FW-2), and the network 112. For example, as shown in FIG. 1, it should be observed that the endpoint devices 101A-B may communicate with the one or more entities 130-142 in the network defense system 125 respectively through each of the first and second firewalls FW-1/FW-2 as well as each of the first and second networks 110/112. Similarly, the simulator 105 may communicate with the entities 130-142 in the network defense system 125 via the network 110 (e.g., the Internet), the front-end firewall FW-2, and then the network 112.

Furthermore, the endpoint devices 101A-B may be communicatively coupled to the cyber security appliance 120 via the first firewall defense (FW-1) and the first network 110, and to any of the entities 130-142 in the network defense system 125 via the second firewall FW-2 and the second network 112. In most embodiments, each of the devices 101A-B may be resident of its own respective host endpoint agents (e.g., as shown with the host endpoint agents 211A-B on the endpoint computing devices 201A-B depicted in FIG. 8). The endpoint devices 101A-B may include, but are not limited to, a mobile phone, a tablet, a laptop, a desktop, Internet of Things (IoT) appliance, and/or the like. Moreover, the endpoint devices 101A-B may be any variety of computing devices capable of cooperating with each other and/or with any of the entities, devices, networks, and so on, over any of the networks 110/112. In several embodiments, the endpoint device 101A may be configured to operate substantially similar to the endpoint device 101B. However, in other embodiments, the endpoint device 101A may be configured to operate different from the endpoint device 101B based on different user roles, permissions, hierarchical relationships, peer groups, etc., in that organization. The endpoint devices 101A-B may include host agents having multiple modules configured to cooperate with each other.

In some embodiments, the networks 110/112 may be implemented as an informational technology network, an operational technology network, a cloud infrastructure, a SaaS infrastructure, a combination thereof, and/or any other type of network capable of communicatively coupling one or more entities/endpoint devices to one or more other entities/endpoint devices. For example, at least one or more of the networks 110/112 may also include one or more networks selected from, but not limited to, an optical network, a cellular network, the Internet, a Local Area Network (LAN), a Wide Area Network (WAN), a satellite network, a cloud-based network, a fiber network, a cable network, any combinations thereof, and/or any other communications network capable of communicatively coupling the one or more endpoint devices 101A-B, the AI simulator 105, and/or the cyber security appliance 120 to the OS database server 122 and any of the other entities (or servers) 130-142. Furthermore, in some embodiments, the network 110 may be an OT network and/or the like (e.g., the Internet), while the network 112 may be an IT network and/or the like.

As shown in FIG. 1, the cyber security appliance 120 may include multiple modules configured to cooperate with each other in conjunction with one or more modules residing in the endpoint devices 101A-B, the simulator 105, and/or the various entities 130-142 in the network defense system 125. Furthermore, as described below in greater detail in FIG. 4, the cyber security appliance 120 may include one or more modules used to: (if) gather/collect data from the endpoint devices 101A-B and any other associated endpoint computing devices, users, and/or entities; (ii) analyze and score the gathered data; (iii) train AI and/or machine learning model(s) with the analyzed/scored data; (iv) determine, if any, autonomous response(s) based on the comparison between the analyzed/scored data and the trained data; (v) trigger the determined autonomous response(s), if any, directly on the respective host endpoint agents on the respective endpoint devices 101A-B; and (vi) communicate those triggered response(s), if any, with the users associated with those respective endpoint devices 101A-B. Whereas, other modules of the cyber security appliance 120 may be used to display data, metrics, etc., regarding other host endpoint agents residing on other respective local endpoint computing devices, where such data may be unified as translated data from those endpoint computing devices and the endpoint devices 101A-B.

The cyber security appliance 120 may be configured with various modules that reference at least one or more AI and/or machine learning models (e.g., as shown with the AI models depicted in FIG. 10), which may be trained on any normal patterns of life, potential cyber threats, behavior patterns (i.e., behavior pattern of life), host endpoint agents, and/or network patterns of life observed from various/all entities in order to protect such entities from any cyber threats within the AI based cyber security system 100. As such, the cyber security appliance 120 may cooperate with multiple (or all) modules and/or instances of the endpoint devices 101A-B, the entities 130-142, and/or the simulator 105 to defend such entities, devices, users, and so on, that are communicatively coupled to one or more of the networks 110/112.

For example, the cyber security appliance 120 may use the at least one or more AI/machine learning models to analyze the pattern of life data for each endpoint device 101A-B and/or each entity 130-142, where each endpoint device 101A-B and entity 130-142 may be communicatively connected to one or more application programming interfaces (APIs) hosted by the cyber security appliance 120. This allows the cyber security appliance 120 to implement those AI/machine learning models trained on the respective endpoint computing devices 101A-B and entities 130-142 to: (i) analyze the collected pattern of life data for the respective host endpoint agents and the respective entity modules connected to the respective APIs hosted by the cyber security appliance 120; and (ii) then compare that analyzed pattern of life data against a normal pattern of life observed for those respective endpoint computing devices 101A-B and entities 130-142. Accordingly, this cooperation between the cyber security appliance 120 and the endpoint devices 101A-B and entities 130-142 may be used to protect against any unusual cyber security threats that may arise from maliciously harming networks, maliciously harming process chains, and so on.

As described above, the network defense system 125 may include one or more entities 130-142 depicted as one or more servers (or content-based server machines), which may be operable under the umbrella of the organization's IT networks, internal networks, and/or any other similar networks. The network defense system 125 may be implemented to protect all the entities 130-142 and any other entities that may connect to this organization's IT networks to transfer/store/retrieve/etc. data. For example, the AI cyber security system 100 may configure the network defense system 125 to protect all of the respective entities 130-142, external/internal email network(s), network-based entities (e.g., such as internal networking databases), and/or any other external/internal network systems associated with the organization's IT network systems and so on.

As shown in FIG. 1, the network entities 130-142 in the network defense system 125 may be accessible to the simulator 105, the cyber security appliance 120, and/or the endpoint devices 101A-B, respectively via the network 110, the firewall FW-2, and the network 112. Furthermore, it should be noted that the endpoint devices 101A-B may communicate with the entities 130-142 in the network defense system 125 through both firewalls FW-1/FW-2 and both networks 110-112. Similarly, the simulator 105 may access any of the respective entities 130-142 in the network defense system 125 via the network 110 (e.g., the Internet), the front-end firewall FW-2, and the network 112. Furthermore, the entities 130-142 may be connectable via the front-end firewall FW-2 and network 112 by having certain associated logging capabilities.

As shown in FIG. 1, the entities 130-142 residing in the network defense system 125 may include, but are not limited to, a communication server 130, a domain name server (DNS) 132, a web server 134, an email server 136, a proxy server 138, an FTP Server 140, and a file server 142. Similarly, any other entities (not shown) may be part of and reside in the network defense system 125, which may be relevant to collect data, store data, transfer data, and so on, such as an anti-virus server, a router, a gateway, and/or the like. Each of the entities 130-142 may be connectable via an internal client network such as the network 112. In some embodiments, more than one or more of the entities 130-142 may be associated with its own internal client network (not shown), where each client network may represent an organizational sub-section, department, peer group/team, and so on. Optionally, various of these internal client networks may be further protected behind one or more other internal firewalls (not shown). Note that, in other embodiments, the various entities 130-142 may be further associated with one or more additional client networks, each performing client functions or representing various sub-organization within an organization's network deployment.

Furthermore, as described above, the OS database server 122 may be connectable and used to periodically query, search, and retrieve specific data (or data points) pertaining to the organization and all its entities.

The AI based cyber security system 100 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data.

Figure 10:
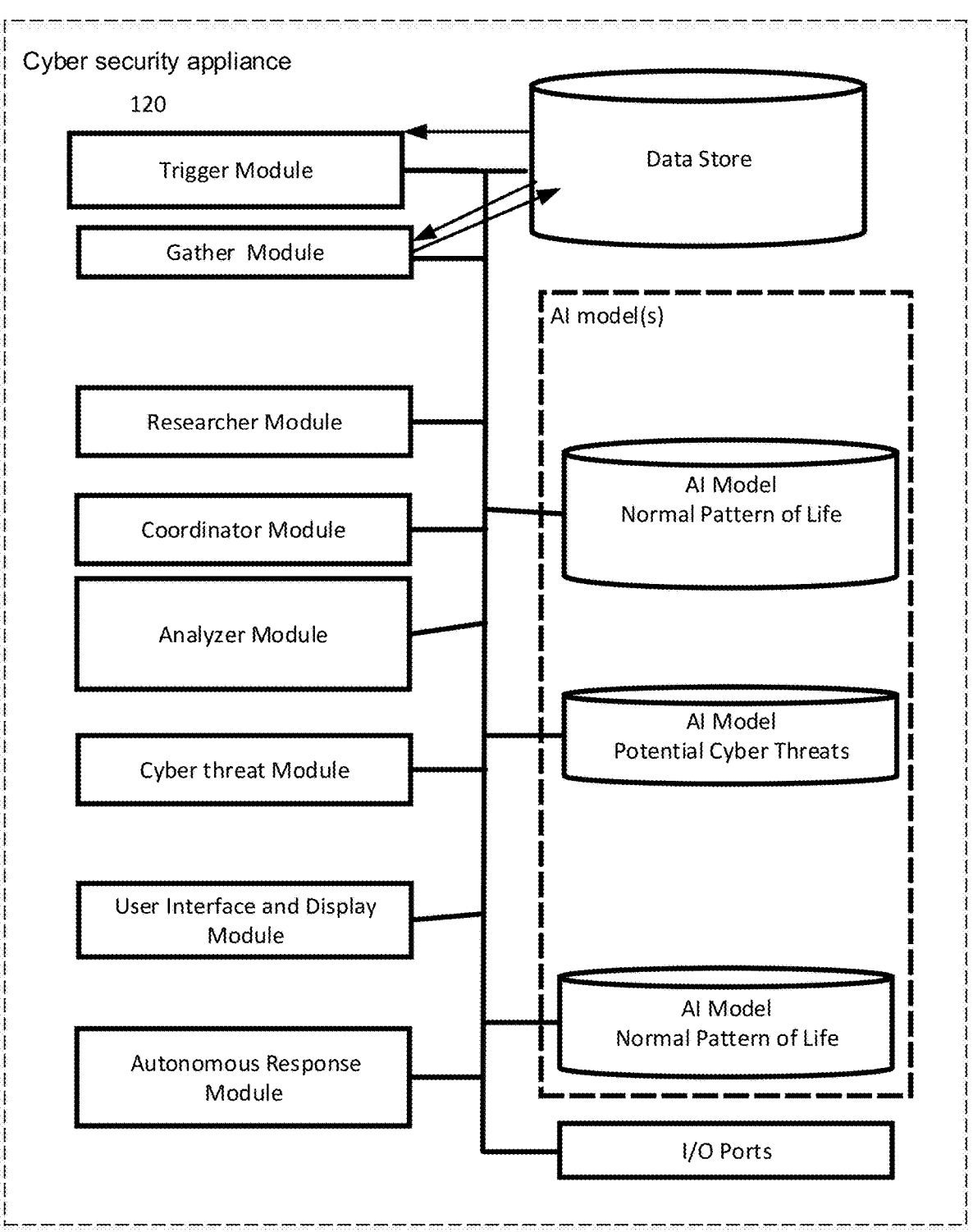
FIG. 10 illustrates a block diagram of a cyber security appliance with various modules cooperating with various machine learning models trained on the discrete pattern of life of one or more email and network connectivity and behavior pattern data, in accordance with an embodiment of the disclosure.
Figure 11:
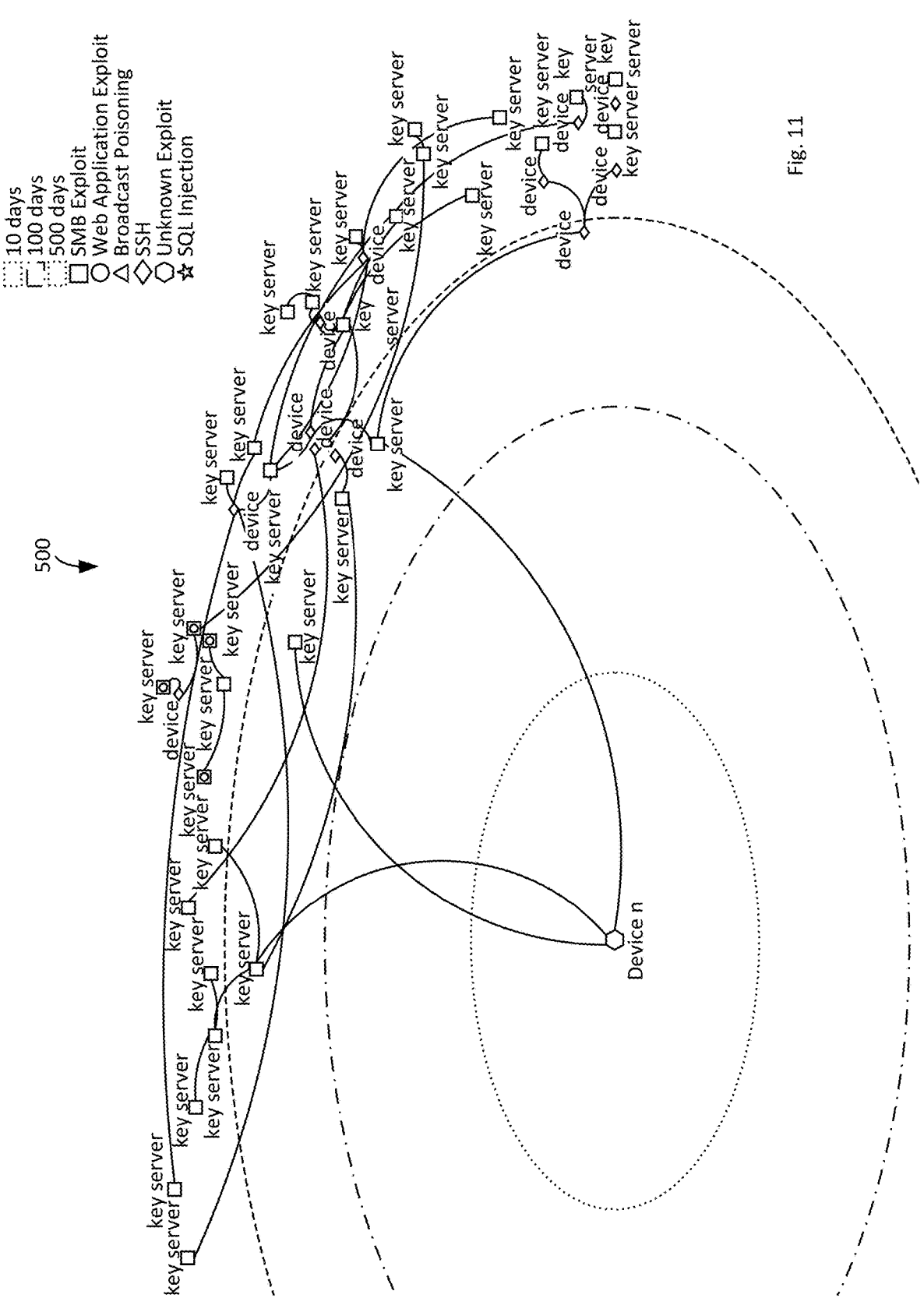
FIG. 11 illustrates an exemplary graph of a cyber threat-infested network used to illustrate multiple vulnerabilities of the network, in accordance with an embodiment of the disclosure.
Figure 12:
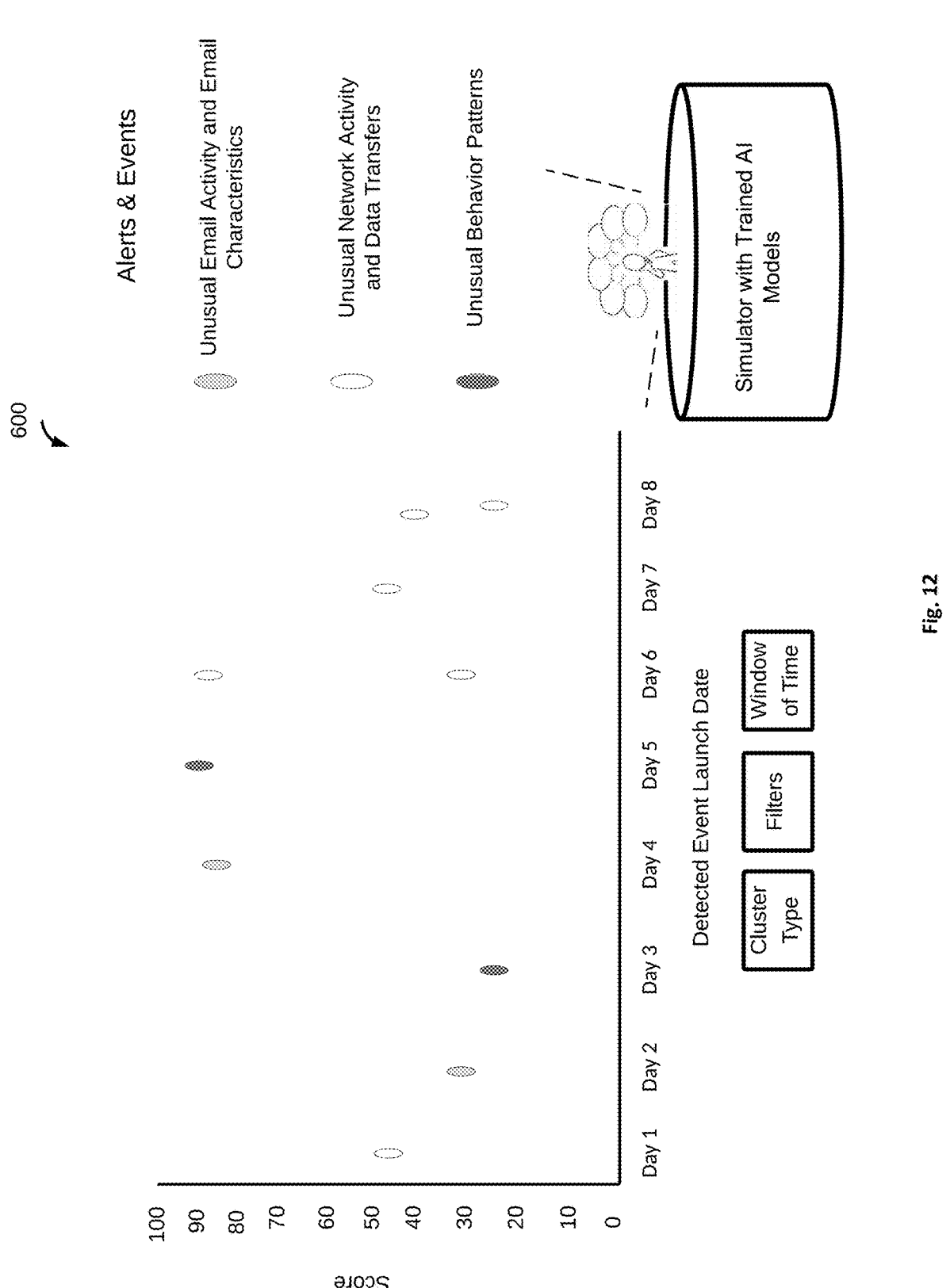
FIG. 12 illustrates a block diagram of a graph depicting one or more events and alerts triggered by any detected unusual email and network connectivity and behaviour patterns, in accordance with an embodiment of the disclosure.
Figure 13:
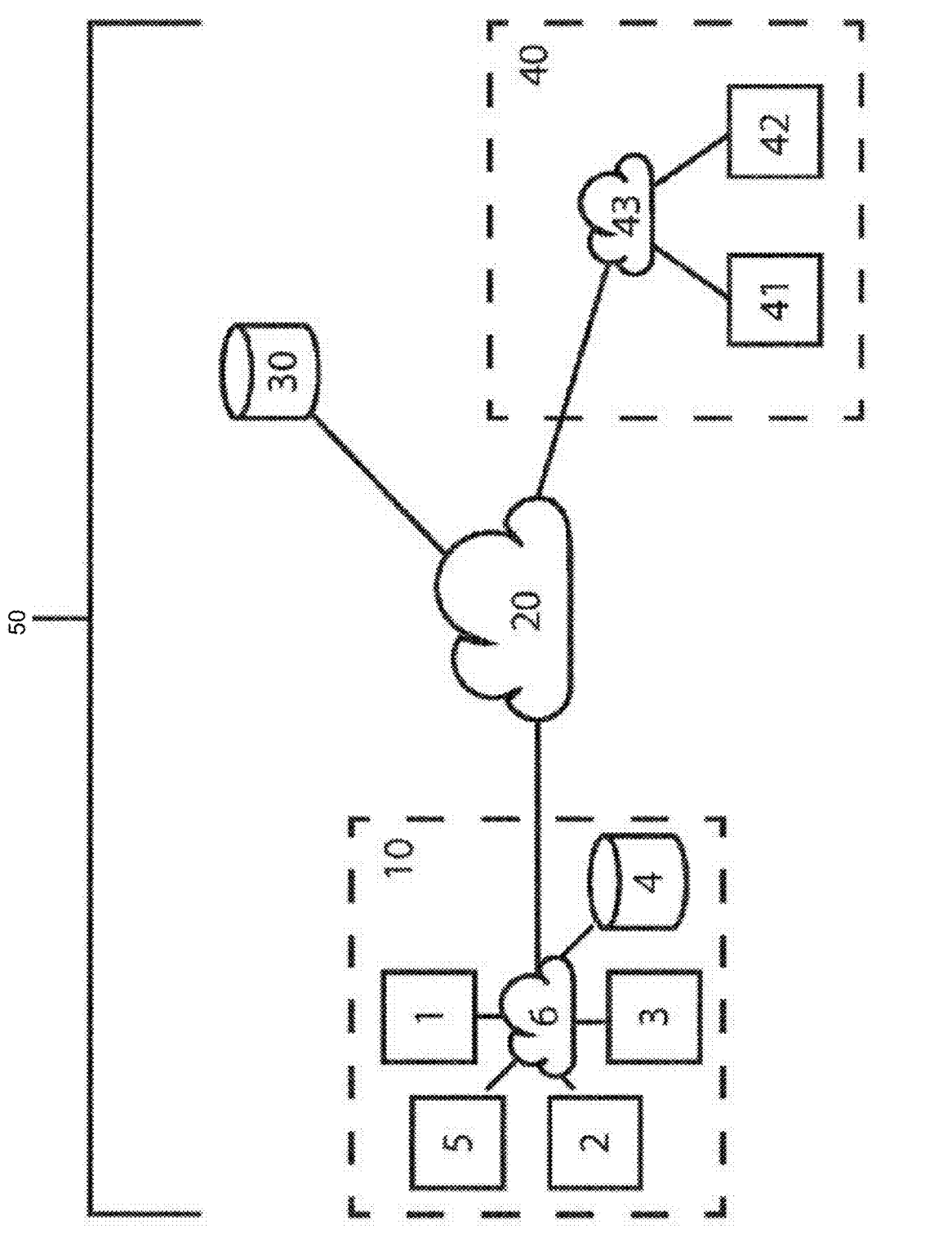
FIG. 13 illustrates an example AI based cyber security system using a cyber threat analyst module to protect an example network, in accordance with an embodiment of the disclosure.
Figure 14:
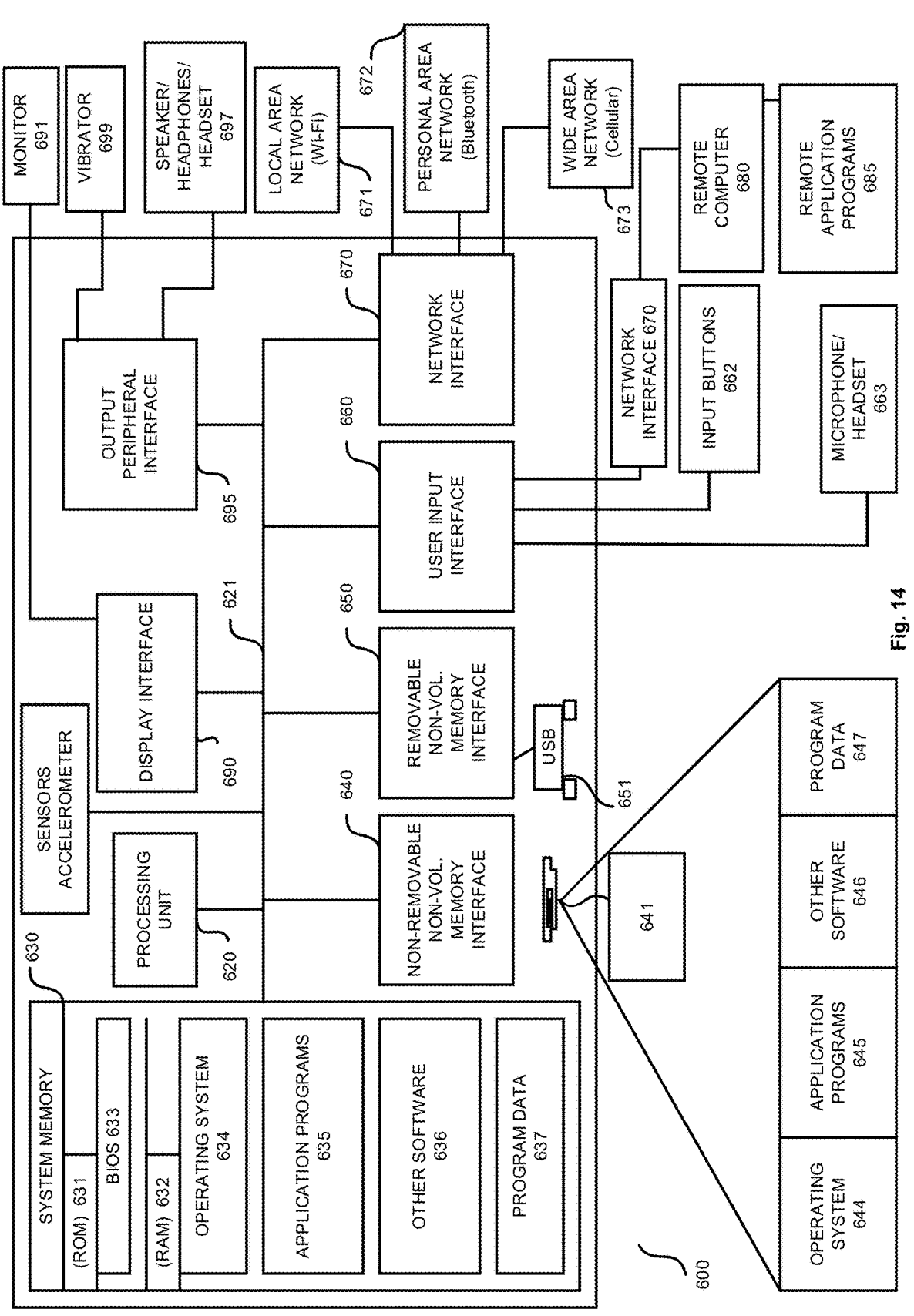
FIG. 14 illustrates a block diagram of an embodiment of one or more computing devices that can be a part of the AI based cyber security system in accordance with an embodiment of the disclosure.

FIG. 10 illustrates a block diagram of an AI based cyber security system having a set of modules configured to cooperate with a cyber security appliance to predict an autonomous response to a detected cyber incident. As shown, an AI based cyber security system 200 having a simulator 105 communicatively coupled over a network 110 with at least one or more of a cyber security appliance 120, host endpoint agents 211A-D, endpoint computing devices 201A-D, and/or entities 122/130/136 is shown, in accordance with an embodiment of the disclosure. Similar to the simulator 105 depicted above in FIG. 1, the AI based cyber security system 200 may implement the simulator 105 depicted in FIG. 8 to simulate any of the depicted agents 211A-D, devices 201A-D, and/or entities 130/136 via the one or more secure communication channels established with the network 110. In several embodiments, as described above, the simulator 105 and/or the cyber security appliance 120 may be configured to receive any collected email and network activities and behavior pattern data from any of the endpoint devices 201A-D, the host endpoint agents 211A-D, and/or the entities 130/136. Such host endpoint agents 211A-D may be located and executed on the respective endpoint computing devices 201A-D.

Figure 8:
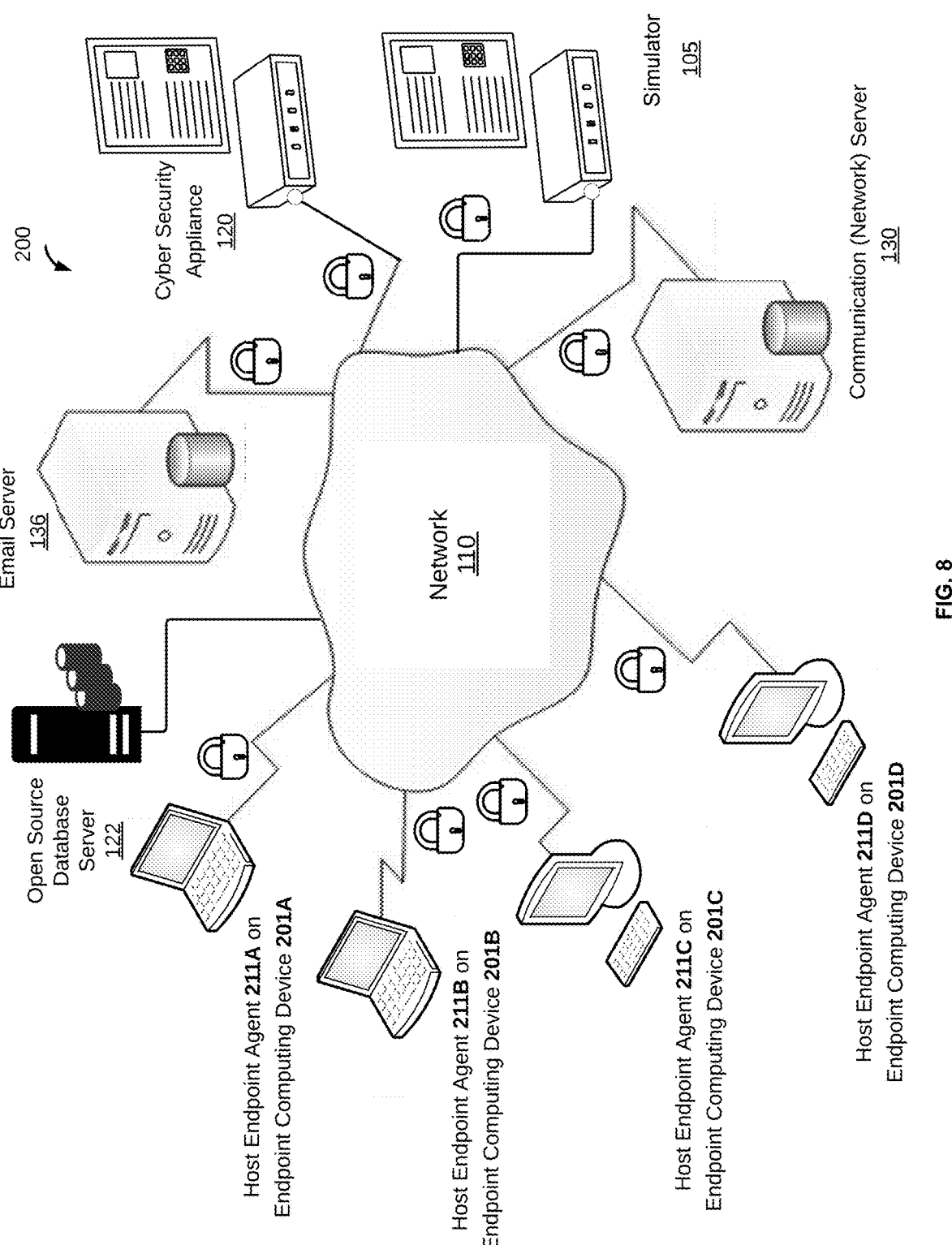
FIG. 8 illustrates a block diagram of an AI based cyber security system having a set of modules configured to cooperate with a cyber security appliance to predict an autonomous response to a detected cyber incident, in accordance with an embodiment of the disclosure.
Figure 9:
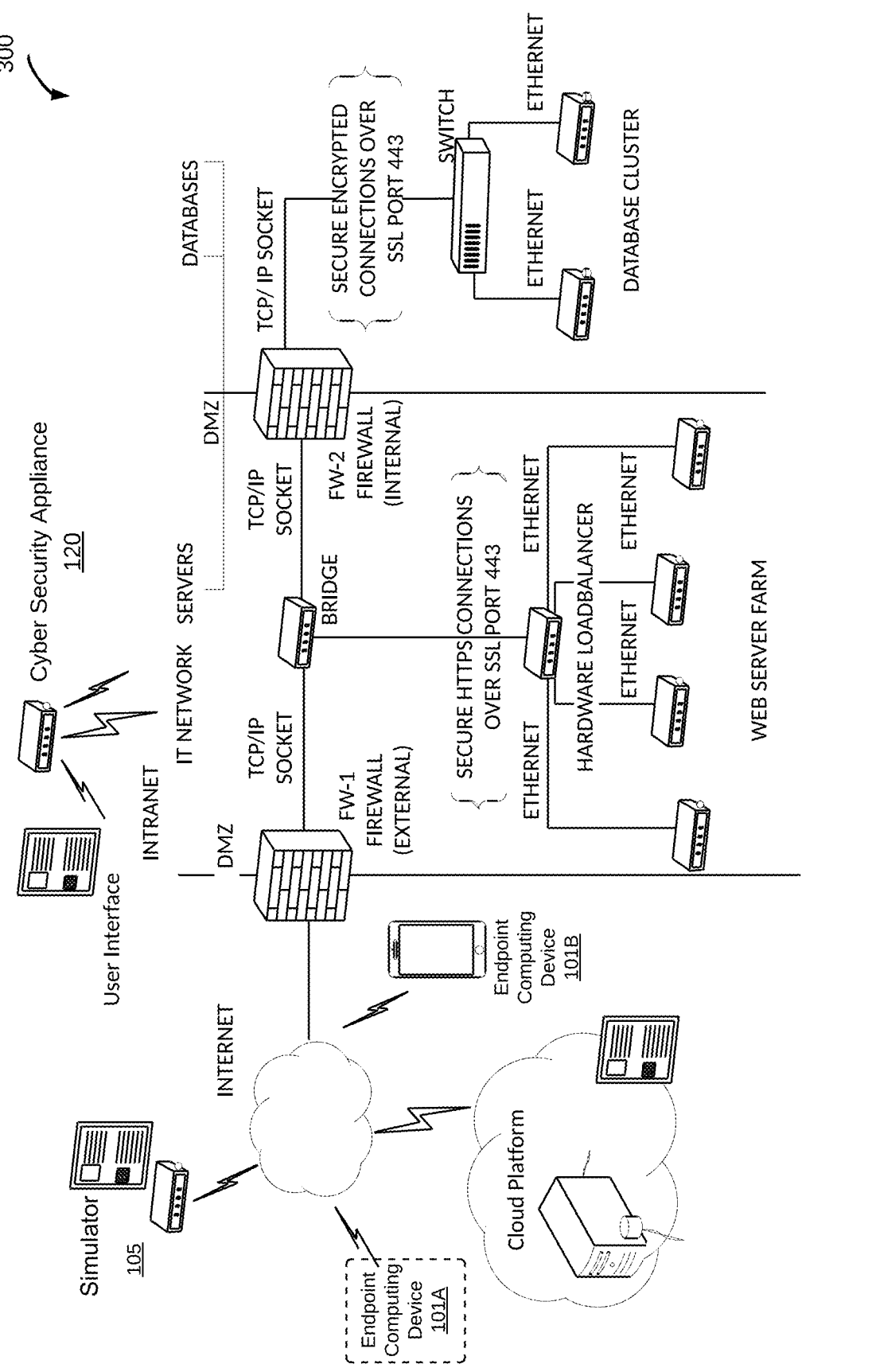
FIG. 9 illustrates a block diagram of an exemplary AI based cyber security platform having a cyber security appliance configured to predict an autonomous response to a detected cyber incident, in accordance with an embodiment of the disclosure.

The AI based cyber security system 200 depicted in FIG. 8 may be substantially similar to the AI based cyber security system 100 depicted in FIG. 1. As such, in most embodiments, the endpoint devices 211A-D, the network 110, the simulator 105, the AI based cyber security appliance 120, and the entities 130/136 depicted in FIG. 8 may be substantially similar to the endpoint devices 101A-B, the network 110 (and/or the network 112), the simulator 105, the AI based cyber security appliance 120, and the entities 130/136 depicted and described in great detail above in FIG. 1.

In some embodiments, the network 110 may be: (i) an informational technology network, (ii) an operational technology network, (iii) a cloud infrastructure, (iv) a SaaS infrastructure, and/or (v) any combination thereof capable of being communicatively coupled to each of the respective simulator 105, the cyber security appliance 120, the endpoint computing devices 201A-D, and/or the entities 122/130/136. The network 110 may be used to communicatively couple the endpoint computing devices 201A-D to at least one or more of the entities 122/130/136 and/or the cyber security appliance 120. Furthermore, as shown in FIG. 8, the endpoint computing device 201A may be communicatively coupled to the network 110 via a secure channel, whereas the entity 122 (i.e., the OS database server) may be communicatively coupled to the network 110 via an unsecure channel. In most embodiments, the one or more entities 122/130/136 may include, but are not limited to, any type of server, database, data store, and/or cloud-based server, service, application, etc. For example, the entities 130/136 may be similar to the entity 122, with the exception that the entity 122 is communicatively coupled over the unsecure (or open) channel, and thus has limited functions, network capabilities, and is not capable of receiving secured data from any of the other depicted entities in FIG. 8. The endpoint computing devices 201A-D and entities 122/130/136 may be any variety of computing devices capable of cooperating with the respective host endpoint agents 211A-D, the simulator 105, and the cyber security appliance 120 over the network 110.

In some embodiments, the host endpoint agents 211A-D may be configured to reside on their respective endpoint devices 201A-D and to: (i) have a low system impact on their respective endpoint devices 201A-D and runs without degrading its performance significantly; (ii) monitor the "pattern of life" of their respective endpoint devices 201A-D (e.g., including monitoring at least one or more of: (a) process behavior (use of network, filesystem, etc.), (b) relationships between processes (parent/child, shared files, IPC, etc.), and/or (c) user behavior (applications commonly used, IT habits, etc.); (iii) make reports on pattern of life metadata, events and alerts to an API whenever connected to the internet or LAN, and while offline, cache data to deliver when possible; (iv) assist in performing IT audits while also completing pattern of life data and events (e.g., including assisting in at least one of more of: (a) audit system details, for example installed operating systems, installed software, software versioning, security update status, etc.; (b) gather system usage activity such as shutdown periods, login failures, file modifications, network connections, etc.; and/or (c) record use of external devices or transfer protocols (e.g., USB usage, Bluetooth usage, email usage, etc.); and/or (v) lastly react autonomously to anomalies in pattern of life (e.g., including responding with at least one or more actions to: (a) cooperate with the appliance 120 with its significantly greater processing power, sets of models including, for example, pulling when available, any actions to be taken and/or be able to take a limited set of actions when a connection to the cyber defense system 200 is not available; (b) provide an operator with the ability to enable the respective host endpoint agents 211A-D to perform a select number of relatively simple actions, when predefined conditions of suspicious behavior and/or anomaly scores/levels are met, independent of the cyber defense appliance; and/or (c) simple and default actions such as actions to prompt user, quarantine a suspicious process (from network access and process as well as internal computing device's process and filesystem), shutdown the offending processes, and so on).

After unleashing the cyber threat, the AI based cyber security system 200 may locate all identifiable employees via public open sources databases/servers 122, such as LinkedIn, industry group and team pages on a company's website, Google, press releases, etc. and then retrieves the employee names, job titles, and another needed/desired inputs. For example, these threat scenarios may include, but are not limited to, (i) Interesting and relevant news article from manager to subordinate, (ii) A critical security patch reminder from manager to subordinate; (iii) Identify payroll management and spoof from relatively important employee to change the details of monthly salary payments; (iv) Identify accounts/finance employees to target for business email compromise style attacks and/or similar styles (e.g., an attempt to submit a fake Purchase Order and so on); and/or (v) and other similar customizable activities and scenarios for attacks on that company.

Referring now to FIG. 3, an AI based cyber security network environment 300 having a simulator 105 in cooperation with a cyber security appliance 120 configured to protect endpoint devices 101A-B and various other network devices is shown, in accordance with an embodiment of the disclosure. As shown in FIG. 3, the AI based cyber security network environment 300 may use the simulator 105—in cooperation with the cyber security appliance 120 if needed perform multiple hypothetical simulations based on the detected incident in this network environment 300 in order to then train and specifically identify any potential vulnerabilities/risks in this environment 300. The AI based cyber security network system 300 depicted in FIG. 3 may be configured similar to the AI cyber security systems 100 and 200 depicted in FIGS. 1-2. As such, in most embodiments, the endpoint devices 101A-B, the simulator 105, and the cyber security appliance 120 depicted in FIG. 3 may be substantially similar to the endpoint devices 101A-B, the simulator 105, and the cyber security appliance 120 depicted in FIGS. 1-2.

The AI based cyber security network environment 300 may be configured as a communications network. The network may include one or more networks selected from, but not limited to, an optical network, a cellular network, the Internet, a LAN, a WAN, a satellite network, a 3$^{rd}$ party "cloud" environment, a fiber network, a cable network, and/or any combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system) may communicate with the server(s). The client computing system may include, for example, the software application or the hardware-based system in which may be able exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as hypertext transfer protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access may be configured to engage in: the request and response cycle from all web browser based applications; the request and response cycle from a dedicated on-line server; the request and response cycle directly between a native application resident on a client device and the cloud-based remote access to another client computing system; and/or combinations thereof.

In an embodiment, the server computing system may include a server engine, a web page management component, a content management component, and a database management component. The server engine may perform basic processing and operating system level tasks. The web page management component may handle creation and display, or routing of web pages or screens associated with receiving and providing digital content and digital advertisements. Users (e.g., cloud users) may access one or more of the server computing systems by means of a uniform resource locator (URL) associated therewith. The content management component may handle most of the functions in the embodiments described herein. The database management component may include, but is not limited to, storage and retrieval tasks with respect to the database, queries to the database, storage of data, and so on.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any hypertext markup language (HTML), wireless access protocol (WAP) enabled client computing system (e.g., the client computing system), and/or any equivalent thereof.

The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Referring now to FIG. 4, a cyber security appliance 120 with various modules cooperating with various AI/machine learning models trained on various observed data points is shown, in accordance with an embodiment of the disclosure. The cyber security appliance 120 may cooperate with the set of modules, the AI models and the simulator 105 depicted in FIG. 1 to protect against cyber security threats from maliciously harming networks as well as from maliciously harming any entities connecting to that network of the organization, where the cyber security appliance 120 is installed, by implementing the simulator 105 (and, if needed, in cooperation with the cyber security appliance 120) to perform multiple hypothetical simulations based on the detected incident in order to identify all potential risks for that organization and all its entities and users. The cyber security appliance 120 and the simulator 105 depicted in FIG. 4 may be substantially similar to the cyber security appliance 120 and the simulator 105 depicted above in FIGS. 1-3. As such, in most embodiments, any of the modules, trained AI models, and AI classifiers referenced and discussed in FIG. 4—in reference to the simulator 105 in conjunction with the cyber security appliance 120 depicted in FIG. 4—may be substantially similar to any of the modules, trained AI models, and AI classifiers depicted and discussed in FIGS. 1-3.

The cyber security appliance 120 may include components one or more modules, stores, and/or components, including, but not limited to, a trigger module, a gather module (or a collections module), a data store, a host module, a user interface and display module, an autonomous response module, at least one input or output (I/O) port to securely connect to other network ports as required, and the simulator 105.

As noted above, the simulator 105 with one or more of cooperating modules in FIG. 4 may be substantially similar to the simulator 105 and all of its cooperating modules depicted in FIG. 1. For example, in most embodiments, the simulator 105 may be configured to duplicate the network, the machine learning algorithms and the cyber security appliance.

Furthermore, the cyber security appliance 120 may include one or more AI and machine learning models such as, but not limited to, a first set of AI models (i.e., the AI model network pattern of life) trained different aspects of the network including users, devices, system activities and interactions between entities in the system, and other aspects of the system; a second set of AI models (i.e., the AI model host pattern of life) trained on pattern of life of host/endpoint computing devices hosting instances of the respective endpoint agents (e.g., trained on the pattern of life pertaining to the endpoint devices 101A-B) including: the users, the multiple software processes, relationships between the software processes, device operation, operating system configuration changes, and other such aspects; a third set of AI models (i.e., the AI model potential cyber threats) trained on any variety of potential cyber threats; and one or more other types of AI models (i.e., the AI model normal pattern of life), each trained on different types of computing devices and operating systems for each type of particular computing device, and other aspects of the systems, as well as other similar components in the cyber security appliance 120. The one or more modules utilize probes to interact with entities in the network (e.g., as described above with the probes depicted in FIG. 3). It should be noted that many of these modules shown in FIG. 4 are substantially similar to the respective modules used in the endpoint devices 101A-B and/or the cyber security appliance 120 described above in FIGS. 1-3, such that those respective modules may be referenced herein without any limitation.

The trigger module may detect time stamped data indicating one or more events and/or alerts from unusual and/or suspicious behavior/activity that are occurring and may then trigger that something unusual is happening. Accordingly, the gather module may be triggered by specific events and/or alerts of anomalies, such as an abnormal behavior, a suspicious activity, and/or any combination thereof. The inline data may be gathered on the deployment from a data store when the traffic is observed. The scope and wide variation of data available in the data store results in good quality data for analysis. The collected data may be passed to the various modules as well as to the data store.

The gather module (or the collections module) may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation may occur between the gather module and the various modules including, but not limited to, the network module, the host endpoint agent coordinator module, the communications module, the cyber threat module, and/or the researcher module.

In addition, the coordination occurs between the above modules and the one or more AI models trained on different aspects of this process. The cyber threat module may cooperate with the network module and the host endpoint agent coordinator module to identify cyber threats based on analysis and determinations by the analyzer module, the anomaly score module, and such. Each hypothesis of typical cyber threats may have various supporting points of data and other metrics associated with that possible threat, such as a human user insider attack, inappropriate network behavior, inappropriate behavior in a particular endpoint computing device, etc. The AI/machine-learning algorithm may look at the relevant points of data to support or refute that particular hypothesis of what the suspicious activity or abnormal behavior related for each hypothesis on what the suspicious activity or abnormal behavior relates to. Networks may have a wealth of data and metrics that may be collected. The gatherer modules may then filter or condense the mass of data down into the important or salient features of data. In an embodiment, the various modules may be combined or kept as separate modules.

The network module and/or the communications module may receive data on the network from the set of probes. For example, each host endpoint agent 101A-B may communicate and exchanges information with the cyber security appliance 120. The network and/or communications modules may reference any of the various available AI machine learning models. The endpoint agent coordinator module may reference one or more of the AI models, using machine learning and Artificial Intelligence algorithms, that are trained on a normal pattern of life of that endpoint computing device with that host endpoint agent 101A-B. The network module may also reference one or more AI/machine learning models, using machine learning and AI algorithms, that are trained on a normal pattern of life of the network.

A researcher module (or a comparator module) may compare the received data on the network and/or the endpoint devices 101A-B to the normal pattern of life for these individual entities and others in the wider network context in order to detect anomalies and any future potential cyber threats. Note that, once the normal pattern of life has been learned by the models, the network module, the endpoint agent coordinator module, and/or the researcher module may readily identify the anomalies in the normal pattern of life and thus any unusual behaviors from the devices, users, or other aspects of the network and its associated host/ endpoint computing devices. Also note that, once the normal pattern of life has been learned by the models, any other modules may be configured to cooperate together to readily identify the anomalies in the normal pattern of life and thus any unusual behaviors from the devices, users, or processes of the network and so on.

The coordinator module may analyze and integrate both activities occurring in the network as well as activities occurring internally within each end-point computing-device at the same time when analyzing the detected anomalies in the normal pattern of life in order to detect the cyber threat. For example, each host endpoint agent may provide pattern of life data to the cyber defense appliance so it may derive pattern of life for each end-point computing-device.

The graphical user interface may display metrics, alerts, and events of both the network in light of activities occurring in endpoint computing device on a common display screen. The graphical user interface allows a viewer to visually contextualize the metrics, alerts, and/or events occurring in the network in light of the activities occurring in the endpoint computing-devices on the common display screen. The graphical user interface also allows a viewer to then to confirm the detected cyber threat in view of what is happening in the network as well as in the endpoint computing devices.

The cyber threat module may compare one or more of the detected anomalies by referencing one or more machine learning models trained on, at least, the cyber threat. Multiple AI/machine learning models may be trained, each model trained on a category of cyber threats and its corresponding members or each model trained on its own specific cyber threat. The cyber threat module cooperates and communicates with the other modules.

The cyber security appliance 120 may supplement the data provided to the users and cyber professionals using a researcher module. The researcher module may use one or more artificial intelligence algorithms to assess whether the anomalous activity has previously appeared in other published threat research or known lists of malicious files or Internet addresses. The researcher module may consult internal threat databases or external public sources of threat data. The researcher module may collect an outside data set describing at least one of an action or a state related to the cyber threat present outside of the network from at least one data source outside the network.

The cyber security appliance 120 may then take actions in response to counter detected potential cyber threats. The autonomous response module, rather than a human taking an action, may be configured to cause one or more rapid autonomous actions in response to be taken to counter the cyber threat. In some embodiments, the user interface for the response module may program the autonomous response module (i) to merely make a suggested response to take to counter the cyber threat that will be presented a display screen and/or sent by a notice to an administrator for explicit authorization when the cyber threat is detected; and/or (ii) to autonomously take a response to counter the cyber threat without a need for a human to approve the response when the cyber threat is detected. The autonomous response module may then send a notice of the autonomous response as well as display the autonomous response taken on the display screen.

The cyber threat module may cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

It should be understood that the cyber security appliance 120 may be hosted on any type and number of computing devices, servers, etc., and/or may be configured as its own cyber threat appliance platform, without limitations.

Referring now to FIG. 5, an exemplary graph 500 of a generated example of a cyber threat-infested network is shown, in accordance with an embodiment of the disclosure. For example, the graph 500 may be used to illustrate an attack by a cyber threat in conjunction with trained AI models cooperating with AI classifiers in producing a list of specific organization-based classifiers for those AI classifiers.

As shown in FIG. 5, initially, the cyber threat is unleashed in the network. The cyber threat may then initiate a specific attack on a specific user that activates, for example, a spoofed payload and thus executes on a device "n" (as shown with the focal and initial "Device n" in FIG. 5) in the organization. In some embodiments, the simulator may be configured to cooperate with the analyzer module and communicate with the profile manager via one or more APIs hosted by the cyber security appliance. As described above, the profile manager module may be used to capture the graph 500, as the profile manager module is configured to maintain all of the profile tags on all of the devices and entities of the organization connecting to that depicted network under analysis. Furthermore, the network module may be used to capture the graph 500, as the network module is particularly used to cooperate with one or more network probes ingesting traffic data of, for example, the depicted network entities, devices, paths, and so on in the depicted network defense system. One or more particular profile tags may be maintained based on their behavior pattern data observed by using the ingested data from the email and/or network modules in conjunction with the trained AI models modelling the normal pattern of life for those entities, devices, paths, etc., depicted in that network defense system in order to obtain those depicted network connectivity and behavioral knowledge and patterns about each of those specific entities, devices, paths, etc., shown with the exemplary graph 500 in FIG. 5.

In other embodiments, the graph 500 may be used to generate an example of that network under analysis used to depict how vulnerable that system in that organization is in regard to the unleashed cyber threats being unleashed in the network on connections between the depicted entities and devices connected to that initially compromised device "n" in that network. As such, the AI based cyber security system may be configured to create the graph of the virtualized network, with its nets and subnets. Each device connecting to the virtualized network is represented as a node in the graph. Two or more of the devices connecting to the virtualized network are assigned with different weighting resistances to malicious compromise from the cyber threat being unleashed during the attack. As discussed later, some devices will be easier to compromise, and some will be harder to compromise.

For example, the exemplary constructed graph 500 of FIG. 5 may be of a virtualized instance of a network including: i) devices connecting to the virtualized instance of the network as well as ii) connections and pathways through the virtualized starting from a source (reduced to a portion of the graph due to size restrictions of this drawing). The source device 'n' is initially compromised by a cyber threat and the end results of a spread of the compromise in a simulation of an example cyber-attack scenario. The dotted circular lines going out from the source device 'n' represent bands of time, such as a number of days e.g., 10 days, 100 days, etc., before various devices on the network will likely be compromised by a given cyber threat in the example cyber-attack scenario. The AI based cyber security system constructs a graph for all devices on each of the subnets in the network that source device 'n' may possibly connect to or get to.

In this example, the AI based cyber security system starts off with an assumption that all systems are vulnerable and for each hop in the network, the algorithm seeks the path of least resistance to get closer to the end goal of the cyber-attack scenario while factoring in profile tags of users and devices, restricted subnets, and other defence mechanisms, such as firewalls, antivirus programs based on matching known virus signatures cooperating with the cyber security appliance (e.g., the cyber security appliance 120 in FIG. 1), etc., are used to make corresponding devices less vulnerable to compromise from the cyber threat. All paths may be considered by the AI based cyber security system (even an unknown exploit or social engineering exploit that shouldn't be a possible pathway through the network) and then the quickest is sought, rather than searching for known vulnerabilities in the whole network and then plotting a course.

Note that, in some embodiments, an end goal algorithm may be triggered to back track a number of compromised devices to calculate a time duration to taking alternative pathways when the last 'x' number of hops through compromised devices does not significantly get the spread of the cyber-attack closer to achieving the end goal of that cyber-attack scenario. The AI based cyber security system may be configured to search and query i) ingested network traffic data as well as ii) analysis on that network traffic data from a data store, from one or more modules, and from one or more AI models within the cyber security appliance. The AI based cyber security system has access to and obtains a wealth of actual network data from the network under analysis from, for example, the data store, modules, and the AI models of normal pattern of life for entities in the network under analysis, which means thousands of paths of least resistance through possible routes in this network may be computed during the simulation even when one or more of those possible routes of least resistance that are not previously known or that have not been identified by a human before to determine a spread of the cyber threat from device-to-device.

For example, the network module of the cyber threat defence appliance already maintains a map of historic connectivity between all devices in the network in order to detect 'new' connections as well as model the normal traffic patterns from components connecting to the network, so the AI based cyber security system may use this as a map of all possible routes to hop to. The AI based cyber security system looks at all known devices that device 'n' has connected to, and the ports and other connection pathways each of these devices used to send traffic or otherwise communicate with each other and devices external to the network, and then calculates the weighting of how difficult it would be to infect/compromise each device. Note the difficulty to compromise a device may be a representation of time taken to infect/compromise a device with the cyber-attack. Difficulty may be calculated based upon the assigned profile tag of the target device. That is, the device with a profile tag of, for example, Windows XP or LLMNR with a human user would have a weighting of 1 (easiest) to transmit to. Note, those devices with profile tags of an anti-virus user or technical user tags would get a slight defence boost which reduces their weighting meaning a longer time to compromise this device.

The AI based cyber security system may also look at other factors. The AI based cyber security system team also identifies recent credentials seen on device 'n' and looks for their use on other devices (as attackers dump credentials from memory on infected devices). The AI based cyber security system may take in manual input on restricted subnets and other factors from the user interface window presented to the user. However, as discussed before, by having access to a wealth of network data from the data store and other components inside that the cyber security appliance, then the AI based cyber security system may impliedly figure out restricted subnets for each device on the network and pathways unknown to human cyber professionals operating this network. For example, when the historic records show that the device 'n' has never accessed any device in a given subnet, then it is likely device 'n' is restricted from having access to that given subnet. In addition, a likelihood of the compromise of a virtual device being simulated may be tailored and accurate to the corresponding actual device being simulated because the cyber-attack scenario is based upon security credentials and behaviour characteristics from actual traffic data fed to the modules, data store, and AI models of the AI based cyber security system (in addition to the cyber security appliance in some embodiments).

Again, some similar concepts and AI training from the mathematical modelling of infectious disease spreading may be applied to cyber threats such as software viruses, malware, insider data theft, and other forms of malicious cyber threats spreading and attacking entities on a network, including key servers. The AI based cyber security system may be configured to determine how likely a cyber-attack may spread in a determined amount of time, such as hours, days, etc., to successfully infect/compromise 1) all components, 2) a maximum number of components within a given time duration, 3) 'x' number of key servers, 4) or other end goal selected by default or set by the user on the network. The AI based cyber security system may monitor the spread of a cyber-attack by drawing a graph of a devices connected a subnet and each subnet making up a network and then weighting the graph based upon how likely it would be for the cyber-attack to spread. Also, the AI based cyber security system may be configured to determine how severe it is when a particular component that the malicious cyber threats spread to, is infected.

The AI based cyber security system may be configured to use these AI models initially trained on spread of the disease, which are then retrained on the spread of malicious cyber threats through different devices on a network. Machine learning can repurpose graph theory analysis from other applications such as epidemiology to the lateral movement of an attacker through a network. The re-training combines i) knowledge of cyber threats, ii) knowledge of 1) security features and credentials, and 2) characteristics of network devices, and iii) other network specific information, such as information technology network information, email network information, SaaS environment information, Cloud information, etc., and iii) previous concepts and training from the mathematical AI modelling of infectious diseases to analyse network systems (e.g., email, IT network, SaaS, cloud, industrial networks, etc.) under analysis and make targeted predictions as well as provide validation of theoretical scenarios and attacks via the one or more modules of the AI based cyber security system, which is then depicted as a simulated and detailed graph (such as the graph 500) and then provided to the organization as a detailed generated and formatted report.

Referring now to FIG. 6, an exemplary graph 600 for depicting events and alerts triggered by various detected unusual network connectivity and behaviour pattern data in relation to their cyber-threat scores and detected event launch times is shown, in accordance with an embodiment of the disclosure. The graph 600 may depict a cluster of unusual behaviors detected and analyzed in an AI cyber security platform, where the cluster of detected unusual behaviors may include, but are not limited to, any detected unusual payload activations based on any email and network activity and/or data transfers as well as any other unusual behavior patterns. For example, the graph 600 may depict one or more different machine learning models (as described above) that are trained to analyze any detected unusual behavior patterns from the collected pattern of life data against the normal pattern of life from any collected data from any of the entities in the organization. For example, the AI based cyber security system may use its analyzer module and cooperating modules to ingest all (or some) of this data to create various automated phishing emails and attack scenarios for any specific entities and/or users of that organization, where all of the detected and analyzed email/ network activity and behavior pattern data may be particularly used to customize those phishing emails for that organization.

In some embodiments, the graph 600 may be provided as a user interface used to show a user the cluster of alerts and/or events associated with the variety of detected unusual email/network activity, data transfers, and behavior patterns, which may further include the respective detailed labels of the characteristics of such detected alerts and/or events. Note that, in these embodiments, the AI based cyber security system may utilize any of the AI models described above for any of its trained contextual knowledge of the organization which includes language-based data, email and network connectivity and behavior pattern data, and historic knowledgebase data.

In other examples, a behavioural pattern analysis of what are the unusual behaviours of the email/network/system/ device/user under analysis by the machine learning models may be as follows. The cyber defence system uses unusual behaviour deviating from the normal behaviour and then builds a sequence of unusual behaviour and the causal links between that sequence of unusual behaviour to detect cyber threats as shown with the graph 600 in FIG. 6. In additional embodiments, the unusual patterns may be determined by filtering out what activities/events/alerts that fall within the window of what is the normal pattern of life for that network/system/device/user under analysis, and then the pattern of the behaviour of the activities/events/alerts that are left, after the filtering, can be analysed to determine whether that pattern is indicative of a behaviour of a malicious actor—human, program, or other threat. Next, the cyber defence system can go back and pull in some of the filtered out normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber defence system is configurable in a user interface, by a user, enabling what type of automatic response actions, if any, the cyber defence system may take when different types of cyber threats, indicated by the pattern of behaviours under analysis, that are equal to or above a configurable level of threat posed by this malicious actor.

The AI models may perform by the threat detection through a probabilistic change in a normal behaviour through the application of an unsupervised Bayesian mathematical model to detect behavioural change in computers and computer networks. The core threat detection system is termed the 'Bayesian probabilistic'. The BP approach can determine periodicity in multiple time series data and identify changes across single and multiple time series data for the purpose of anomalous behaviour detection. From the email and potentially IT network raw sources of data, a large number of metrics can be derived each producing time series data for the given metric.

The detectors in the analyser module including its network module (simulator can get extract meta data from network module) and email module components can be discrete mathematical models that implement a specific mathematical method against different sets of variables with the target. Thus, each model is specifically targeted on the pattern of life of alerts and/or events coming from, for example, i) that cyber security analysis tool analysing various aspects of the emails, iii) coming from specific devices and/or users within a system, etc. At its core, the AI adversary red team as well as the cyber security appliance may mathematically characterize what constitutes 'normal' behaviour in line with the normal pattern of life for that entity and organization based on the analysis of a large number/set of different measures of a device's network behaviour. Such red team and appliance can build a sophisticated 'pattern of life'—that understands what represents normality for every person, device, entity, email activity, and network activity in the system being protected by the cyber threat defense system. For example, the analyzer module may rank supported candidate cyber threat hypotheses by a combo of likelihood that this candidate cyber threat hypothesis is supported and a severity threat level of this incident type.

In addition, the correlation of the reporting and formatting modules may be configured to generate the report (or the graphs) with the identified critical devices connecting to the virtualized instance of the network under analysis that should have the priority to allocate security resources to them, along with one or more portions of the constructed graph. The formatting module may have an autonomous email-report composer that cooperates with the various AI models and modules of the AI based cyber security system as well as at least a set of one or more libraries of sets of contextual text, objects, and visual representations to populate on templates of pages in the email threat report based on any of the training and/or simulated attacking scenarios observed. The autonomous email-report composer can compose an email threat report on cyber threats that is composed in a human-readable format with natural language prose, terminology, and level of detail on the cyber threats aimed at a target audience being able to understand the terminology and the detail. Such modules and AI models may cooperate with the autonomous email-report composer to indicate in the email threat report, for example, an email attack's purpose and/or targeted group (such as members of the finance team, or high-level employees).

The formatting module may format, present a rank for, and output the current email threat report, from a template of a plurality of report templates, that is outputted for a human user's consumption in a medium of, any of 1) a printable report, 2) presented digitally on a user interface, 3) in a machine readable format for further use in machine-learning reinforcement and refinement, and 4) any combination of the three. The system may use at least three separate machine learning models or any particular number of separate AI machine learning models. For example, a machine learning model may be trained on specific aspects of the normal pattern of life for entities in the system, such as devices, users, email/network traffic flow, outputs from one or more cyber security analysis tools analysing the system, etc. One or more machine learning models may also be trained on characteristics and aspects of all manner of types of cyber threats. One or more machine learning models may also be trained on composing email threat reports.

The various modules cooperate with each other, the AI models, and the data store to carry out the operations discussed above with regard to the AI based cyber security system. Such modules may cooperate to improve the analysis of the how vulnerable the organization is based on any of the observed (or trained/simulated/pentested) unusual events are to that specific organization and thus improve the formalized report generation with specific vulnerabilities and the extend of those vulnerabilities with less repetition to consume less CPU cycles, as well as doing this more efficiently and effectively than humans. For example, the modules can repetitively go through these steps and re-duplicate steps to filter and rank the one or more supported possible cyber threat hypotheses from the possible set of cyber threat hypotheses and/or compose the detailed information to populate into the email threat report. Note that, one or more processing units are configured to execute software instructions associated with the AI based cyber security system and any of its cooperating modules in that depicted system. Also note, that one or more non-transitory storage mediums are configured to store at least software associated with the AI adversary red team simulator/apparatus, the other modules, and the AI models and classifiers.

The AI based cyber threat security/defense self-learning platform may use machine-learning technology with the simulator. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This AI cyber security system with the simulator may therefore be built and trained to have a sophisticated 'pattern of life'—that understands what represents normality for every person, device, and network activity associated with any of the users and/or entities in such system being protected by such AI based cyber security system.

The AI cyber security system with the simulator may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This AI cyber security system with the simulator may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices may communicate with each other in a network environment. The network environment has a communications network. The network may include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system may communicate with the server(s). The client computing system may include, for example, the software application or the hardware-based system in which the client computing system may be able to exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be configured to utilize a protocol, such as Hypertext Transfer Protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access is configured to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system may include a server engine, a web page management component, a content management component, and a database management component. The server engine may perform basic processing and operating-system level tasks. The web page management component may handle creation and display, or routing of web pages or screens associated with receiving and providing digital content and digital advertisements. Users (e.g., cloud users) may access one or more of the server computing systems by means of a Uniform Resource Locator ("URL") associated therewith. The content management component may handle most of the functions in the embodiments described herein. The database management component may include storage and retrieval tasks with respect to the database, queries to the database, and storage of data.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any Hypertext Markup Language ("HTML") or Wireless Access Protocol ("WAP") enabled client computing system or any equivalent thereof. The client computing system may host a browser and/or a specific application to interact with the server computing system. Each application has a code scripted to perform the functions that the software component is configured to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

FIG. 7 illustrates an example Artificial Intelligence based cyber security system using a cyber threat analyst module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100, computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation.

The cyber security appliance 100 is built to deal with the fact that today's attackers are getting stealthier and an attacker/malicious agent may be 'hiding' in a system to ensure that they avoid raising suspicion in an end user, such as by slowing their machine down.

The cyber security appliance 100 builds a sophisticated 'pattern of life'—that understands what represents normality for every person, device, and network activity in the system being protected by the cyber security appliance 100.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation. To combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance's 100 AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 8 illustrates a block diagram of an embodiment of one or more computing devices that can be a part of the AI based cyber security system for an embodiment of the current design discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus comprising:

a defined set of modules, including a cyber threat module and an autonomous response module, and one or more artificial intelligence models configured to detect and respond to a cyber incident, where the defined set of modules and the one or more artificial intelligence models are part of a cyber security appliance installed in a network, where the cyber threat module is configured to cooperate with the autonomous response module to cause one or more autonomous responses in response to be taken to counter a cyber threat that is part of the cyber incident, where the autonomous response module, rather than a human taking an action, is configured to cause the one or more autonomous responses in response to be taken to counter the cyber threat in the detected cyber incident;

a simulator configured to simulate an actual cyber attack of the cyber incident on the network, including physical devices, being protected by the set of modules and artificial intelligence models configured to detect the cyber incident;

a feedback loop between i) the set of modules and artificial intelligence models configured to detect the cyber incident and ii) the simulator configured to simulate the actual cyber attack of the cyber incident on the network including physical devices being protected by the set of modules and artificial intelligence models configured to detect the cyber incident during an ongoing detected cyber incident, where an attack path modeling module is configured to feed details of the detected cyber incident by the cyber threat module into an input module of the simulator, where the simulator is configured to run one or more hypothetical simulations of that detected cyber incident and cooperate with the autonomous response module in order to predict and control the one or more autonomous responses to the detected cyber incident, and where any software instructions forming part of the set of modules, the artificial intelligence models, and the simulator are stored in an executable form in one or more memories and executed by one or more processors.

2. The apparatus of claim 1, where the simulator is configured to construct a graph of a virtualized instance of the network including i) the physical devices connecting to the virtualized instance of the network as well as ii) connections and pathways through the virtualized instance of the network, and where the set of modules in the cyber security appliance are configured to cooperate with the simulator to predict an initial autonomous response to the detected cyber incident and then how effectively the initial autonomous response performs in mitigating the detected cyber incident once the autonomous response module takes the initial autonomous response, where the initial autonomous response is visible to an attacker in the actual cyber attack, and the set of modules in the cyber security appliance are configured to cooperate with the simulator to predict how the attacker may possibly alter their plans in response to being detected and the initial autonomous response that is visible to the attacker.

3. The apparatus of claim 2, where the simulator is configured to run the one or more hypothetical simulations of the detected incident to calculate one or more paths of least resistance from the virtualized instance of a source device through to other virtualized instances of components of the network until reaching an end goal of each hypothetical simulation of the detected incident, but not calculate every theoretically possible path from the virtualized instance of the source device to the end goal of each hypothetical simulation of the detected incident.

4. The apparatus of claim 1, where the simulator is further configured to prioritize which devices connecting to a virtualized instance of the network should have a priority to allocate security resources to them based on results of the one or more hypothetical simulations of the detected incident, and where the set of modules in the cyber security appliance are configured to cooperate with the simulator to predict an initial autonomous response to the detected cyber incident and then how effectively the initial autonomous response performs in mitigating the detected cyber incident once the autonomous response module takes the initial autonomous response, where the initial autonomous response is hidden to an attacker in the actual cyber attack.

5. The apparatus of claim 2, where the simulator is configured to construct the graph of the virtualized network, with its nets and subnets, where two or more of the devices connecting to the virtualized network are assigned with different weighting resistances to malicious compromise from the one or more hypothetical simulations based on the actual cyber attack of the cyber incident on the virtualized instance of the network.

6. The apparatus of claim 1, where the simulator is further configured to run a single hypothetical simulation based on the actual cyber attack of the cyber incident on a virtualized instance of the network in order to calculate a set of paths of possible cyber attack propagation in the network if no autonomous response action is taken in response to the actual cyber attack of the cyber incident.

7. The apparatus of claim 6, where the simulator is further configured to calculate, based at least in part on the results of the one or more hypothetical simulations, a risk score for each device, the risk score being indicative of a possible severity of a compromise if no autonomous response action is taken in response to the actual cyber attack of the cyber incident.

8. The apparatus of claim 1, where once the simulator runs the one or more hypothetical simulations, a pattern of life, conditions, and indicators in the network are recorded to show what indicators and level of detected cyber incident would have been needed to trigger the one or more autonomous responses.

9. The apparatus of claim 1, where the simulator is further configured to increase a risk score associated with a first device based at least in part on: a determination that the first device has been a target in past cyber attacks, the first device is in connection with a second device which is designated as essential to the network, and the first device is in connection with at least one device with a risk score over a pre-defined threshold risk score.

10. The apparatus of claim 1, where the simulator is configured to run the one or more hypothetical simulations of the detected incident to calculate one or more paths of least resistance for each hypothetical simulation to compromise 1) a virtualized instance of a source device, originally compromised by the cyber incident, 2) through to other virtualized instances of components of a virtualized network, 3) until reaching an end goal of that hypothetical simulation of the one or more hypothetical simulations in the virtualized network, all based on historic knowledge of connectivity and behavior patterns of users and devices within the network under analysis.

11. A method for predicting one or more autonomous responses to a detected cyber incident, the method comprising:

configuring a defined set of modules, including a cyber threat module and an autonomous response module, and one or more artificial intelligence models configured to detect and respond to the cyber incident, where the defined set of modules and the one or more artificial intelligence models are part of a cyber security appliance installed in a network;

configuring the cyber threat module to cooperate with the autonomous response module to cause the one or more autonomous responses in response to be taken to counter a cyber threat that is part of the detected cyber incident, where the autonomous response module, rather than a human taking an action, is configured to cause the one or more autonomous responses in response to be taken to counter the cyber threat in the detected cyber incident;

configuring a simulator configured to simulate an actual cyber attack of the detected cyber incident on the network, including physical devices, being protected by the set of modules and artificial intelligence models configured to detect the cyber incident;

configuring a feedback loop between i) the set of modules and artificial intelligence models configured to detect the cyber incident and ii) the simulator configured to simulate the actual cyber attack of the cyber incident on the network including physical devices being protected by the set of modules and artificial intelligence models configured to detect the cyber incident during an ongoing detected cyber incident, where an attack path modeling module is configured to feed details of the detected cyber incident by the cyber threat module into an input module of the simulator, where the simulator is configured to run one or more hypothetical simulations of that detected cyber incident and cooperate with the autonomous response module in order to predict and control the one or more autonomous responses to the detected cyber incident, and where any software instructions forming part of the set of modules, the artificial intelligence models, and the simulator are stored in an executable form in one or more memories and executed by one or more processors.

12. The method of claim 11, further comprising configuring the simulator to construct a graph of a virtualized instance of the network including i) the physical devices connecting to the virtualized instance of the network as well as ii) connections and pathways through the virtualized instance of the network.

13. The method of claim 12, further comprising configuring the simulator to run the one or more hypothetical simulations of the detected incident to calculate one or more paths of least resistance from the virtualized instance of a source device through to other virtualized instances of components of the network until reaching an end goal of each hypothetical simulation of the detected incident, but not calculate every theoretically possible path from the virtualized instance of the source device to the end goal of each hypothetical simulation of the detected incident.

14. The method of claim 11, further comprising configuring the simulator to prioritize which devices connecting to a virtualized instance of the network should have a priority to allocate security resources to them based on results of the one or more hypothetical simulations of the detected incident.

15. The method of claim 12, further comprising configuring the simulator to construct the graph of the virtualized network, with its nets and subnets, where two or more of the devices connecting to the virtualized network are assigned with different weighting resistances to malicious compromise from the one or more hypothetical simulations based on the actual cyber attack of the cyber incident on the virtualized instance of the network; and running a single hypothetical simulation based on the actual cyber attack of the cyber incident on the virtualized instance of the network in order to calculate a set of paths of possible cyber attack propagation in the network if no autonomous response action is taken in response to the actual cyber attack of the cyber incident.

16. The method of claim 15, further comprising configuring the simulator to calculate, based at least in part on the results of the one or more hypothetical simulations, a risk score for each device, the risk score being indicative of a possible severity of the compromise if no autonomous response action is taken in response to the actual cyber attack of the cyber incident.

17. The method of claim 11, where once the simulator runs the one or more hypothetical simulations, a pattern of life, conditions, and indicators in the network are recorded to show what indicators and level of detected cyber incident would have been needed to trigger the autonomous response action.

18. The method of claim 11, further comprising configuring the simulator to increase a risk score associated with a first device based at least in part on: a determination that the first device has been a target in past cyber attacks, the first device is in connection with a second device which is designated as essential to the network, and the first device is in connection with at least one device with the risk score over a pre-defined threshold risk score.

19. The method of claim 11, further comprising configuring the simulator to run the one or more hypothetical simulations of the detected incident to calculate one or more paths of least resistance for each hypothetical simulation to compromise 1) a virtualized instance of a source device, originally compromised by the cyber incident, 2) through to other virtualized instances of components of a virtualized network, 3) until reaching an end goal of that hypothetical simulation of the one or more hypothetical simulations in the virtualized network, all based on historic knowledge of connectivity and behavior patterns of users and devices within the network under analysis.

20. A non-transitory computer readable medium in an apparatus, comprising one or more computer readable codes operable, when executed by one or more processors, to instruct the apparatus to perform the method of claim 11.

\*    \*    \*    \*    \*